(12) United States Patent
Sawada et al.

(10) Patent No.: US 10,506,890 B2
(45) Date of Patent: Dec. 17, 2019

(54) CUP HOLDER

(71) Applicant: TOYODA GOSEI CO., LTD., Kiyosu-shi, Aichi-ken (JP)

(72) Inventors: Shinichi Sawada, Kiyosu (JP); Shinji Kawakami, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 318 days.

(21) Appl. No.: 15/429,224

(22) Filed: Feb. 10, 2017

(65) Prior Publication Data

US 2017/0258252 A1    Sep. 14, 2017

(30) Foreign Application Priority Data

Mar. 11, 2016 (JP) ................................ 2016-048546
Sep. 29, 2016 (JP) ................................ 2016-190715

(51) Int. Cl.
 *A47G 23/02* (2006.01)
 *B60N 3/10* (2006.01)

(52) U.S. Cl.
 CPC ......... *A47G 23/0216* (2013.01); *B60N 3/105* (2013.01)

(58) Field of Classification Search
 CPC ............... A47G 23/02; A47G 23/0208; A47G 23/0216; B60N 3/105
 USPC ........ 220/8, 345.1, 628, 629, 632, 634, 694; 220/737; 224/275, 926; 248/311.2; 296/24.34
 See application file for complete search history.

(56) References Cited

U.S. PATENT DOCUMENTS

| | | | | |
|---|---|---|---|---|
| 4,941,635 A | * | 7/1990 | Lan | A47G 23/03 248/205.9 |
| 5,195,711 A | * | 3/1993 | Miller | A47C 7/70 224/275 |
| 5,897,090 A | * | 4/1999 | Smith | B01L 9/06 206/306 |
| 6,585,210 B1 | * | 7/2003 | Lee | A47F 9/042 211/69.6 |

(Continued)

FOREIGN PATENT DOCUMENTS

| | | |
|---|---|---|
| CN | 204030226 U | 12/2014 |
| JP | 2003-165370 A | 6/2003 |

(Continued)

OTHER PUBLICATIONS

Office action dated Nov. 21, 2018 issued in corresponding CN patent application No. 201710140807.9 (and English machine translation thereof).

(Continued)

*Primary Examiner* — Steven A. Reynolds
*Assistant Examiner* — Javier A Pagan
(74) *Attorney, Agent, or Firm* — Posz Law Group, PLC

(57) ABSTRACT

A cup holder includes a holder body having a peripheral wall surrounding an accommodation space, a tray provided in the accommodation space and vertically shiftably supported by the peripheral wall, and a height adjuster configured to vertically shift the tray. The height adjuster includes at least one rack gear extending vertically on the peripheral wall, at least one pinion gear rotatably supported by the tray and meshing with the rack gear, and an energizing member provided at the tray and energizing to rotate the pinion gear for upward shift of the tray.

7 Claims, 28 Drawing Sheets

(56) References Cited

U.S. PATENT DOCUMENTS

| | | | | |
|---|---|---|---|---|
| 6,637,617 B2* | 10/2003 | Eisenbraun | ............ | B60N 3/103 220/720 |
| 6,705,580 B1* | 3/2004 | Bain | ............ | B60N 3/106 248/311.2 |
| 7,036,700 B2* | 5/2006 | Engel | ............ | B60N 3/106 224/501 |
| 7,354,086 B2* | 4/2008 | Park | ............ | B60N 3/10 224/926 |
| 7,416,161 B2* | 8/2008 | Shin | ............ | B60N 3/106 224/282 |
| 7,455,341 B2* | 11/2008 | Miyashita | ............ | B60N 3/102 220/345.4 |
| 7,694,928 B2* | 4/2010 | Lee | ............ | B60N 3/101 224/281 |
| 7,748,679 B2* | 7/2010 | Kikuchi | ............ | B60N 3/101 224/926 |
| 7,757,888 B2* | 7/2010 | Ogura | ............ | B60N 3/106 220/345.1 |
| 7,828,171 B2* | 11/2010 | Ogura | ............ | B60N 3/102 220/262 |
| 9,221,581 B2* | 12/2015 | Yokota | ............ | B65D 21/08 |
| 2003/0029878 A1* | 2/2003 | Peitzmeier | ............ | B60N 3/102 220/737 |
| 2005/0269472 A1* | 12/2005 | Wagner | ............ | B60N 3/102 248/311.2 |
| 2006/0243875 A1* | 11/2006 | Chen | ............ | B60N 3/106 248/311.2 |
| 2007/0075205 A1* | 4/2007 | Shin | ............ | B60N 3/106 248/311.2 |
| 2010/0200720 A1* | 8/2010 | Kaemmer | ............ | B60N 3/106 248/311.2 |
| 2017/0258252 A1* | 9/2017 | Sawada | ............ | B60N 3/105 |

FOREIGN PATENT DOCUMENTS

| | | | |
|---|---|---|---|
| JP | 2005-145384 | * | 6/2005 |
| JP | 2005-145384 A | | 6/2005 |
| JP | 2007-269074 A | | 10/2007 |
| JP | 2008-221993 A | | 9/2008 |
| JP | 2009-040196 A | | 2/2009 |
| JP | 2015-136976 A | | 7/2015 |
| JP | 2017-144875 A | | 8/2017 |

OTHER PUBLICATIONS

Office Action dated Aug. 20, 2019 issued in corresponding JP patent application No. 2016-190715 (and English translation).

* cited by examiner

CUP HOLDER

BACKGROUND

1. Technical Field

The present invention relates to a cup holder including a vertically shiftable tray configured to hold a beverage container.

2. Related Art

A vehicle is provided, in the interior, with a cup holder accommodating a beverage container. The cup holder is designed to vertically shift its bottom part in accordance with height of the beverage container.

Japanese Unexamined Patent Publication No. 2015-136976 discloses a cup holder depicted in FIG. 30. This cup holder includes a holder body 92 having a peripheral wall 91 surrounding an accommodation space 90 accommodating a beverage container, a tray 93 provided in the accommodation space 90, and a tension coil spring 95 provided between the peripheral edge of the tray 93 and the peripheral wall 91 of the holder body 92. The peripheral wall 91 is provided in a lower portion with a lock portion 96. The tray 93 is latched to the lock portion 96 and is thus held to a lower portion of the accommodation space 90. Unlatching at the lock portion 96 causes the tension coil spring 95 to contract so as to shift the tray 93 upward.

In the cup holder disclosed in Japanese Unexamined Patent Publication No. 2015-136976, however, the upper end of the tension coil spring 95 is latched to an upper portion of the peripheral wall 91 and the tray 93 is hung by the tension coil spring 95. The tray 93 can only ascend to the lower end of the tension coil spring 95 with positional restriction on the ascending tray 93. This configuration achieves low flexibility in vertical positional setting of the tray.

SUMMARY

In view of such a condition, an object of the present invention is to provide a cup holder including a tray of high flexibility in vertical positional setting.

A cup holder according to the present invention includes a holder body having a peripheral wall surrounding an accommodation space, a tray provided in the accommodation space and vertically shiftably supported by the peripheral wall, and a height adjuster configured to vertically shift the tray. The height adjuster includes at least one rack gear extending vertically on the peripheral wall, at least one pinion gear rotatably supported by the tray and meshing with the rack gear, and an energizing member provided at the tray and energizing to rotate the pinion gear for upward shift of the tray.

The tray rotatably supports the pinion gear in this configuration. The pinion gear meshes with the rack gear provided on the peripheral wall of the holder body. The pinion gear is rotated on the rack gear to shift upward by energizing force of the energizing member. The tray supporting the pinion gear is also shifted upward.

When the tray is pressed downward, the pinion gear rotates on the rack gear to shift downward along with the tray against the energizing force of the energizing member.

The energizing member is provided at the tray. Specifically, the energizing member does not couple the holder body and the tray to hang the tray from the holder body. The energizing member according to the present invention does not have positional restriction on the ascending tray. The tray according to the present invention thus has higher flexibility in vertical positioning than the tray of the cup holder disclosed in Japanese Unexamined Patent Publication No. 2015-136976.

DETAILED DESCRIPTION

A cup holder according to each preferred embodiment of the present invention will now be described in detail.

First Embodiment

A cup holder according to the present embodiment is mounted at a center console in the interior of a vehicle. The drawings depicting the cup holder according to the present embodiment indicate front, rear, right, left, up, and down directions viewed from a driver on a driver's seat of the vehicle.

Figure 1:
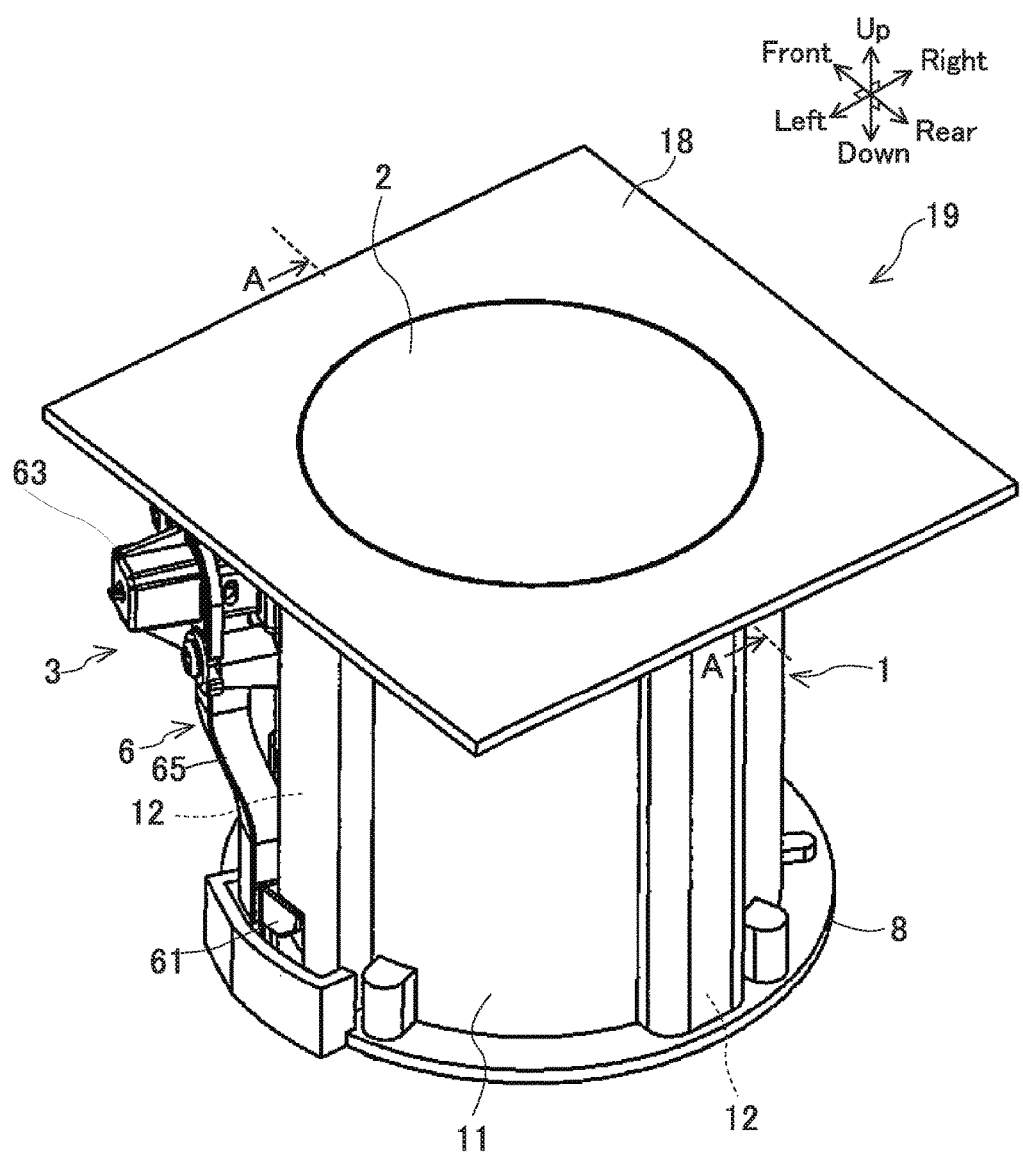
FIG. 1 is a perspective view of a cup holder according to a first embodiment of the present invention, including a tray located at the uppermost position.
Figure 2:
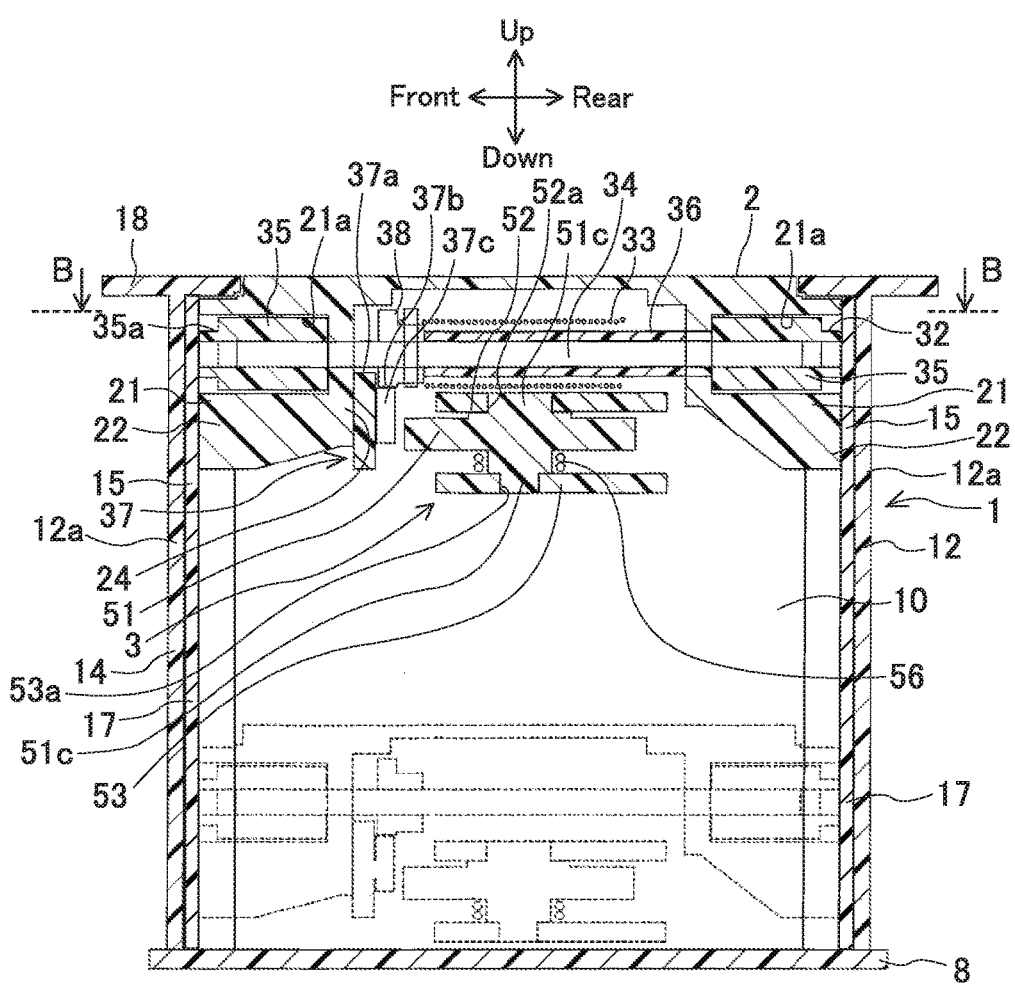
FIG. 2 is a sectional view taken along line A-A indicated in FIG. 1.

As depicted in FIGS. 1 and 2, the cup holder according to the present embodiment includes a holder body 1, a tray 2, and a height adjuster 3 configured to adjust height of the tray 2.

Figure 3:
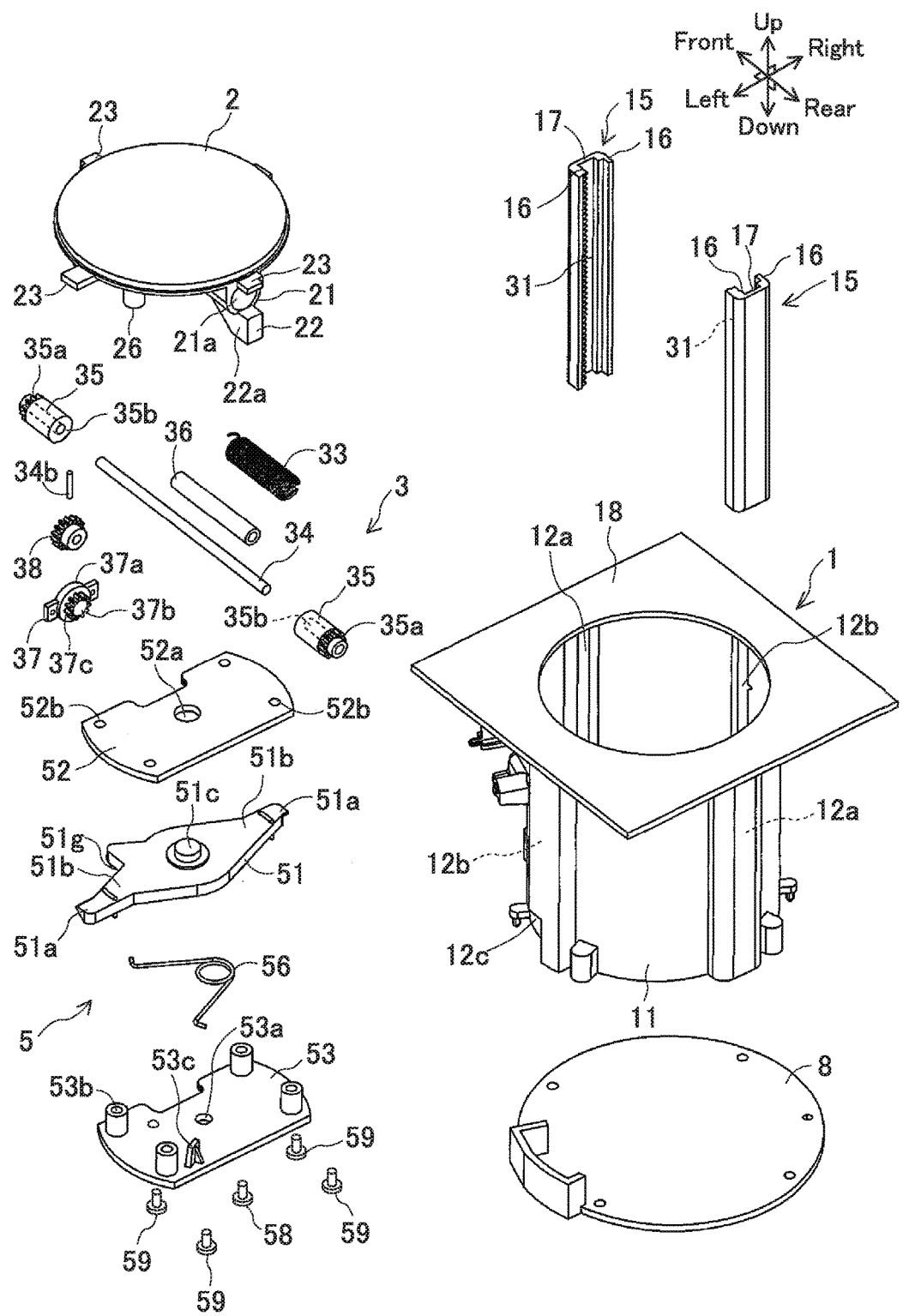
FIG. 3 is an exploded perspective view of the cup holder according to the first embodiment.

As depicted in FIG. 3, the holder body 1 includes a tubular peripheral wall 11 and an upper wall 18 expanding around the upper edge of the peripheral wall 11.

Figure 4:
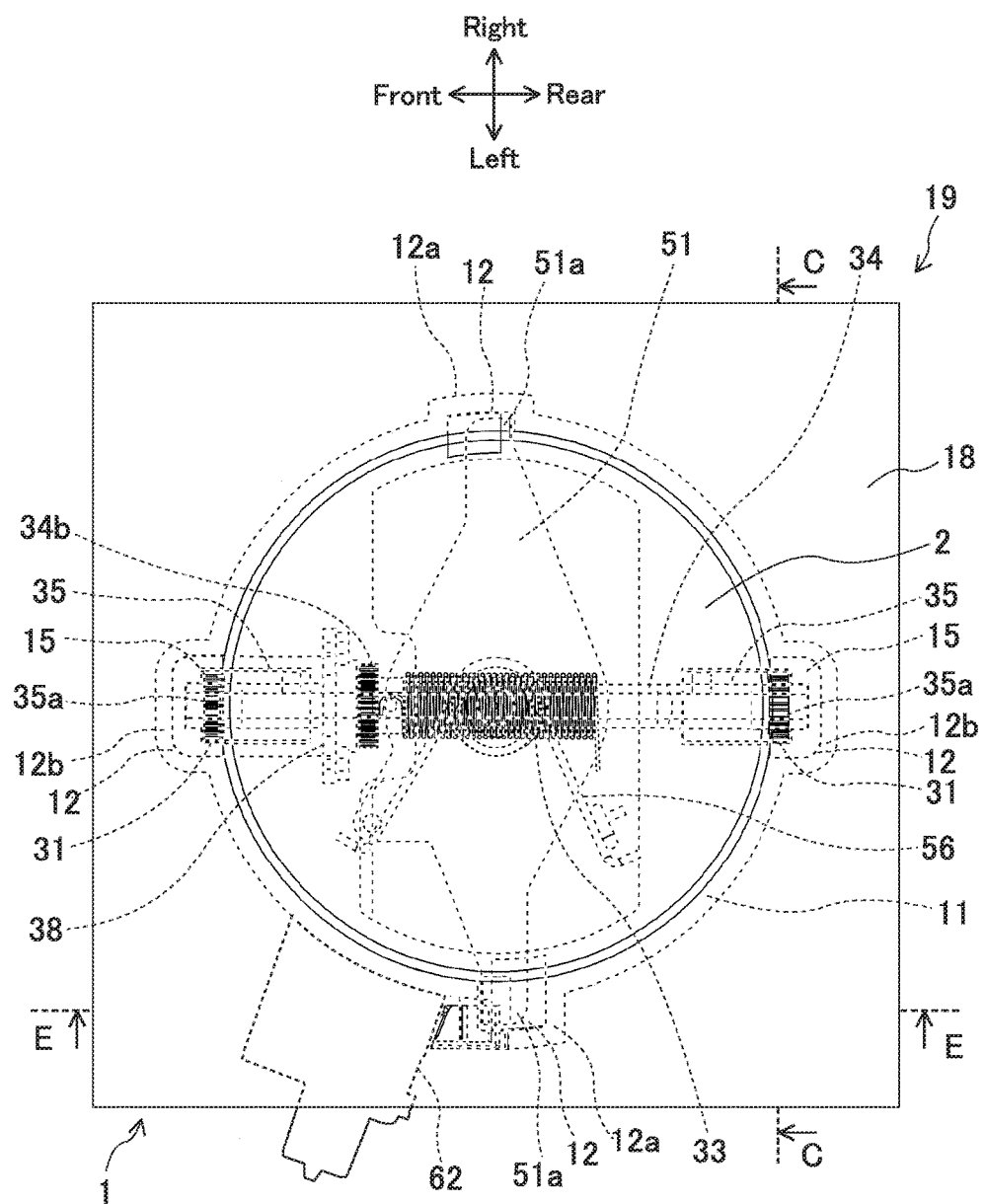
FIG. 4 is a plan view of the cup holder according to the first embodiment.

As depicted in FIG. 4, the peripheral wall 11 has four grooves 12, 12, 12, and 12 disposed at equal peripheral intervals. The four grooves 12, 12, 12, and 12 are located at front, rear, right, and left positions of a cup holder 19. Among the grooves 12 according to the present embodiment, the pair of grooves 12 and 12 disposed at the front and rear positions of the cup holder 19 will be referred to as first grooves 12a while the pair of grooves 12 and 12 disposed at the right and left positions will be referred to as second grooves 12b.

Figure 5:
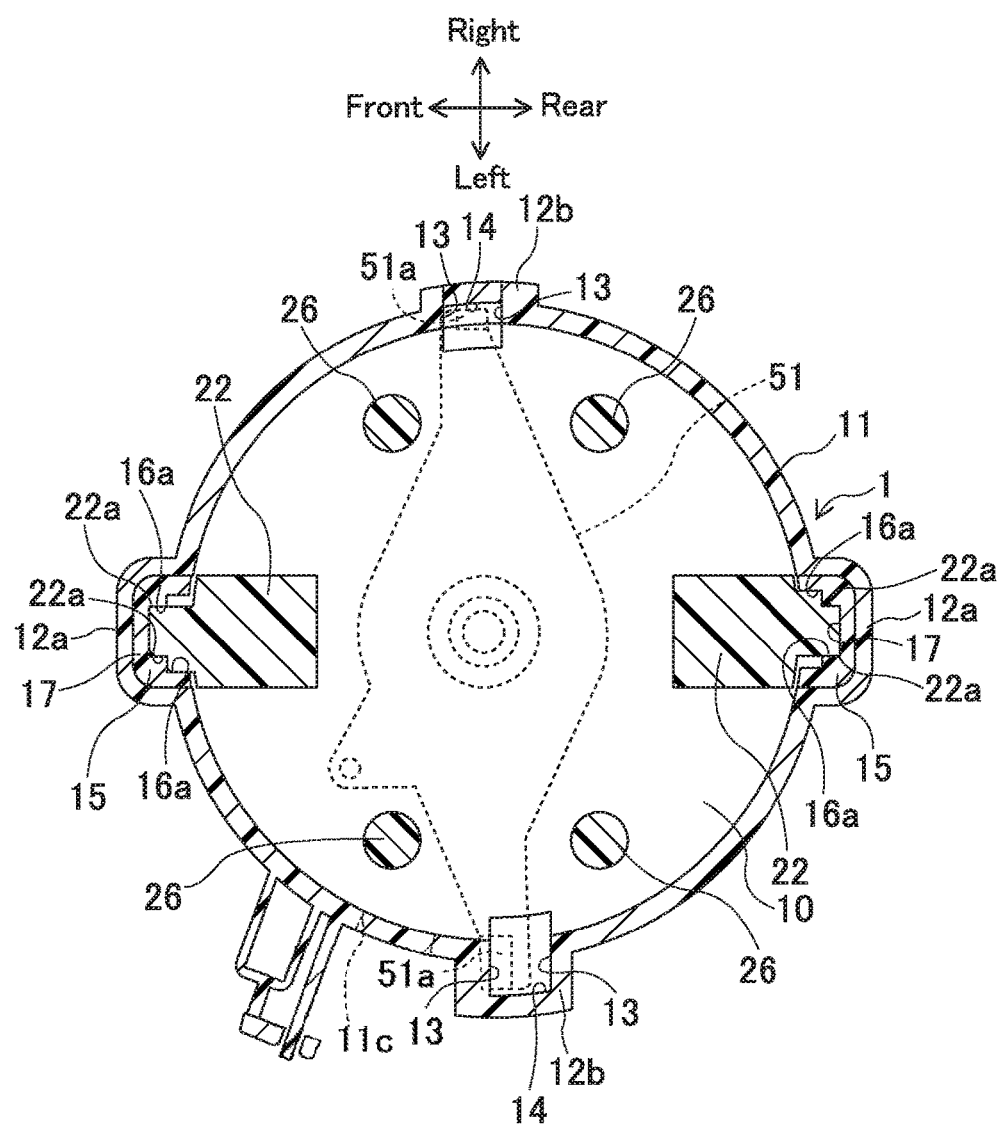
FIG. 5 is a sectional view taken along line B-B indicated in FIG. 2.

As depicted in FIGS. 3 and 5, each of the first grooves 12a fits to a rack member 15 shaped to match the groove 12. The rack member 15 is long and has a U sectional shape, and includes a pair of opposite side walls 16 and 16 and a back wall 17 provided at the back of the rack member 15 and coupling the pair of side walls 16 and 16.

Each of the second grooves 12b is provided with a latch portion 51a of a lock member 51 configured to lock the tray 2 from below and an inhibitor 61 to be described later. As depicted in FIG. 5, each of the second grooves 12b is surrounded with a pair of opposite side walls 13 and 13 and a back wall 14 provided at the back of the second groove 12b and coupling the pair of side walls 13 and 13.

As depicted in FIG. 3, the lower end of the peripheral wall 11 is closed by a bottom plate 8 having a substantially disc shape. The peripheral edge of the bottom plate 8 is fixedly screwed to the lower end of the peripheral wall 11 of the holder body 1. The peripheral wall 11 and the bottom plate 8 surround an accommodation space 10 accommodating a beverage container.

As depicted in FIGS. 2 and 3, the tray 2 has a disc shape and is vertically shiftably disposed in the accommodation space 10.

The height adjuster 3 is configured to vertically shift the tray 2. The height adjuster 3 includes the pair of rack members 15, a pair of gear members 35, an energizing member 33, a lock mechanism 5, and an operating part 6.

The pair of rack members 15 and 15 are provided in the first grooves 12a. In the pair of side walls 16 and 16 of each of the rack members 15 in the first grooves 12a, the side wall 16 on the left of the cup holder 19 is provided with a rack gear 31. The rack gear 31 extends along the first groove 12a, in other words, vertically.

The pair of gear members 35 are provided below the tray 2. The tray 2 is further provided therebelow with a rotatable transmitting shaft 34. The transmitting shaft 34 has a rod shape and extends from the front to the rear of the cup holder 19, in other words, in a radial direction of the tray 2. The transmitting shaft 34 has longitudinal ends provided with the gear members 35.

As depicted in FIG. 3, each of the gear members 35 has a columnar shape and includes a pinion gear 35a surrounding the outer peripheral distal end and a fitting hole 35b axially penetrating the gear member 35. The fitting holes 35b receive the distal ends of the transmitting shaft 34. The gear members 35 are thus integrally fixed to the distal ends of the transmitting shaft 34. The pinion gears 35a of the pair of gear members 35 are identical in the number of gear teeth and thus rotate in synchronization with each other.

Figure 6:
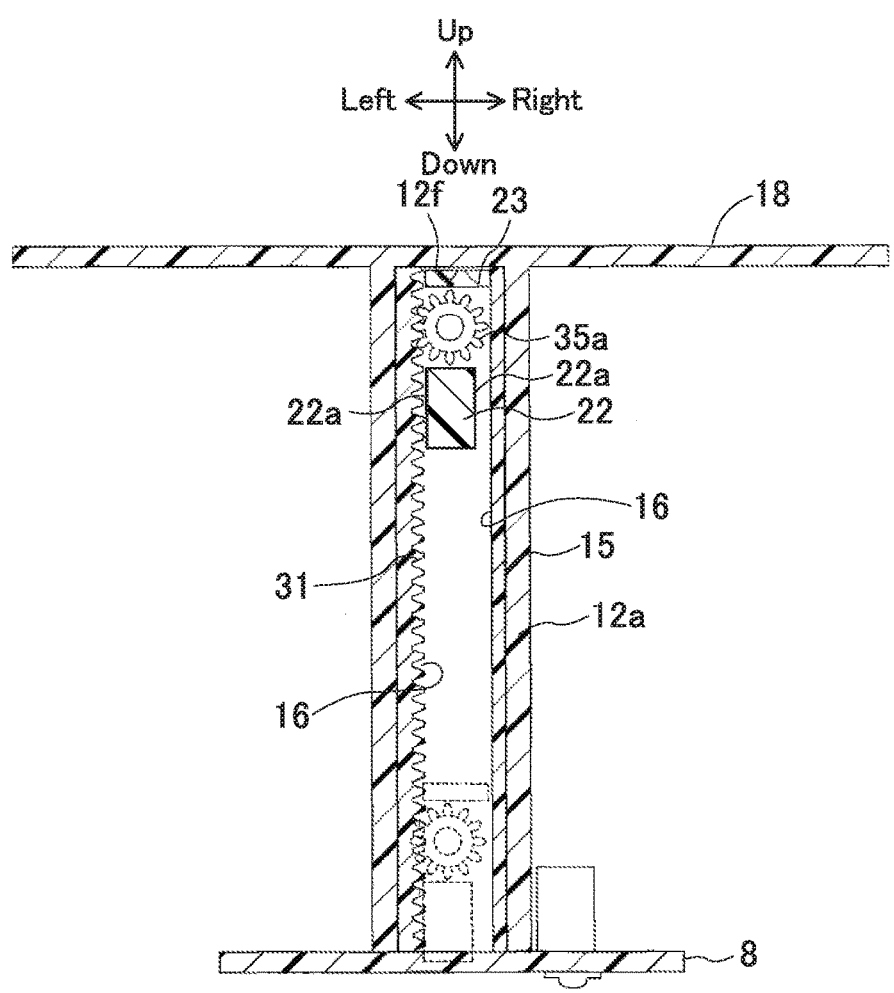
FIG. 6 is a sectional view taken along line C-C indicated in FIG. 4.

The tray 2 has a pair of holding parts 21 and 21 protruding from portions facing the first grooves 12a. Each of the holding parts 21 has a bearing hole 21a. The gear member 35 rotatably penetrates the bearing hole 21a. As depicted in FIG. 6, the pinion gear 35a at the distal end of the gear member 35 meshes with the rack gear 31 of the first groove 12a. The pinion gears 35a vertically shift along the rack gears 31 as the tray 2 vertically shifts.

As depicted in FIGS. 3 and 5, the pair of holding parts 21 and 21 are provided at the lower ends with guide protruded portions 22. Each of the guide protruded portions 22 protrudes radially outward from the holding part 21 and has a pair of tray opposite surfaces 22a. The pair of tray opposite surfaces 22a are provided on peripherally right and left sides of the guide protruded portion 22 and extend vertically.

Figure 7:
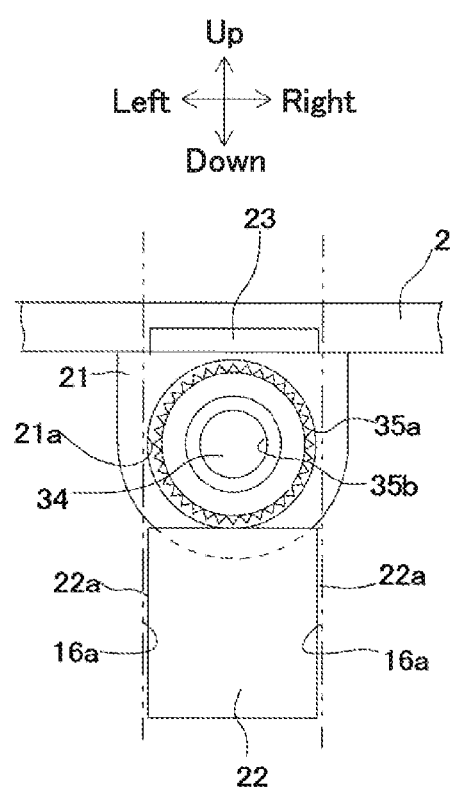
FIG. 7 is a side view of the tray provided with a guide protruded portion and a holding part according to the first embodiment.

As depicted in FIGS. 5 and 7, each of the guide protruded portions 22 vertically shiftably fits to the rack member 15 in the first groove 12a. The pair of side walls 16 and 16 of the rack member 15 are positioned behind the rack gear 31 and have groove opposite surfaces 16a and 16a facing each other along the periphery of the accommodation space 10. The guide protruded portions 22 of the tray 2 are inserted to the rack members 15 in the first grooves 12a, and the tray opposite surfaces 22a and 22a face the groove opposite surfaces 16a and 16a. The tray opposite surfaces 22a and 22a face the groove opposite surfaces 16a and 16a, respectively, and are shaped to match the groove opposite surfaces 16a and 16a. The groove opposite surfaces 16a and 16a and the tray opposite surfaces 22a and 22a according to the present embodiment are vertically extending flat surfaces.

As depicted in FIG. 7, the guide protruded portion 22 is sandwiched between the pair of groove opposite surfaces 16a and 16a with the pair of tray opposite surfaces 22a in planar contact with the groove opposite surfaces 16a and 16a. The pair of groove opposite surfaces 16a and 16a receive a load applied to the tray 2 and horizontally keep the tray 2. When the tray 2 vertically shifts, the pinion gear 35a shifts along the rack gear 31 and the tray opposite surfaces 22a of the tray 2 slide along the groove opposite surfaces 16a and 16a in the first groove 12a. Each of the guide protruded portions 22 is disposed in the first groove 12a with the pair of tray opposite surfaces 22a in planar contact with the pair of groove opposite surfaces 16a, so that the tray 2 is held stably to the holder body 1. The tray 2 can thus shift vertically in the accommodation space 10 stably and smoothly.

As depicted in FIGS. 3 and 7, the tray 2 further includes tabular protrusions 23 at the peripheral edge of the tray 2 and immediately above the guide protruded portions 22. Each of the protrusions 23 is inserted to the first groove 12a along with the guide protruded portion 22 and is sandwiched between the groove opposite surfaces 16a and 16a in the first groove 12a. The protrusions 23 secure a constant gap between the peripheral edge of the tray 2 and the peripheral wall 11 of the holder body 1 to prevent interference between the tray 2 and the peripheral wall 11. The tray 2 can thus smoothly shift vertically.

As depicted in FIGS. 2 and 3, the energizing member 33 is a coil spring and is provided around a tubular collar 36 that allows the transmitting shaft 34 to penetrate. The energizing member 33 has a first end fitting to a pin 34b protruding from the transmitting shaft 34 and a second end coupled to the lower surface of the tray 2. The energizing member 33 energizes the transmitting shaft 34 to shift the tray 2 upward. The energizing member 33 according to the present embodiment energizes the transmitting shaft 34 to rotate the transmitting shaft 34 rightward (clockwise). Rightward rotation of the transmitting shaft 34 causes the pinion gears 35a to rotate along the rack gears 31 and shift upward. The tray 2 is thus shifted upward.

The tray 2 is provided therebelow with a speed buffer 37. The speed buffer 37 includes a fixed part 37a, a rotary part 37b configured to be rotatable with respect to the fixed part 37a, and viscose liquid interposed between the fixed part 37a and the rotary part 37b. The fixed part 37a of the speed buffer 37 is screwed to an attachment 24 protruding downward from the lower surface of the tray 2 (FIG. 2). The rotary part 37b has a distal end provided with a gear 37c. The transmitting shaft 34 allows a transmission gear 38 to be inserted therethrough and fixed integrally thereto.

The transmission gear 38 meshes with the gear 37c of the speed buffer 37. Rotation of the transmitting shaft 34 causes synchronous rotation of the transmission gear 38. Rotation of the transmission gear 38 causes rotation of the gear 37c of the speed buffer 37. The gear 37c receives resistance from the viscose liquid in the speed buffer 37 to moderate sudden change in rotational speed. Moderated rotational speed of the gear 37c suppresses sudden speed change of the transmitting shaft 34. The speed buffer 37 moderates a sudden increase in rotational speed in a case where the energizing member 33 suddenly increases the rotational speed of the transmitting shaft 34.

Figure 8:
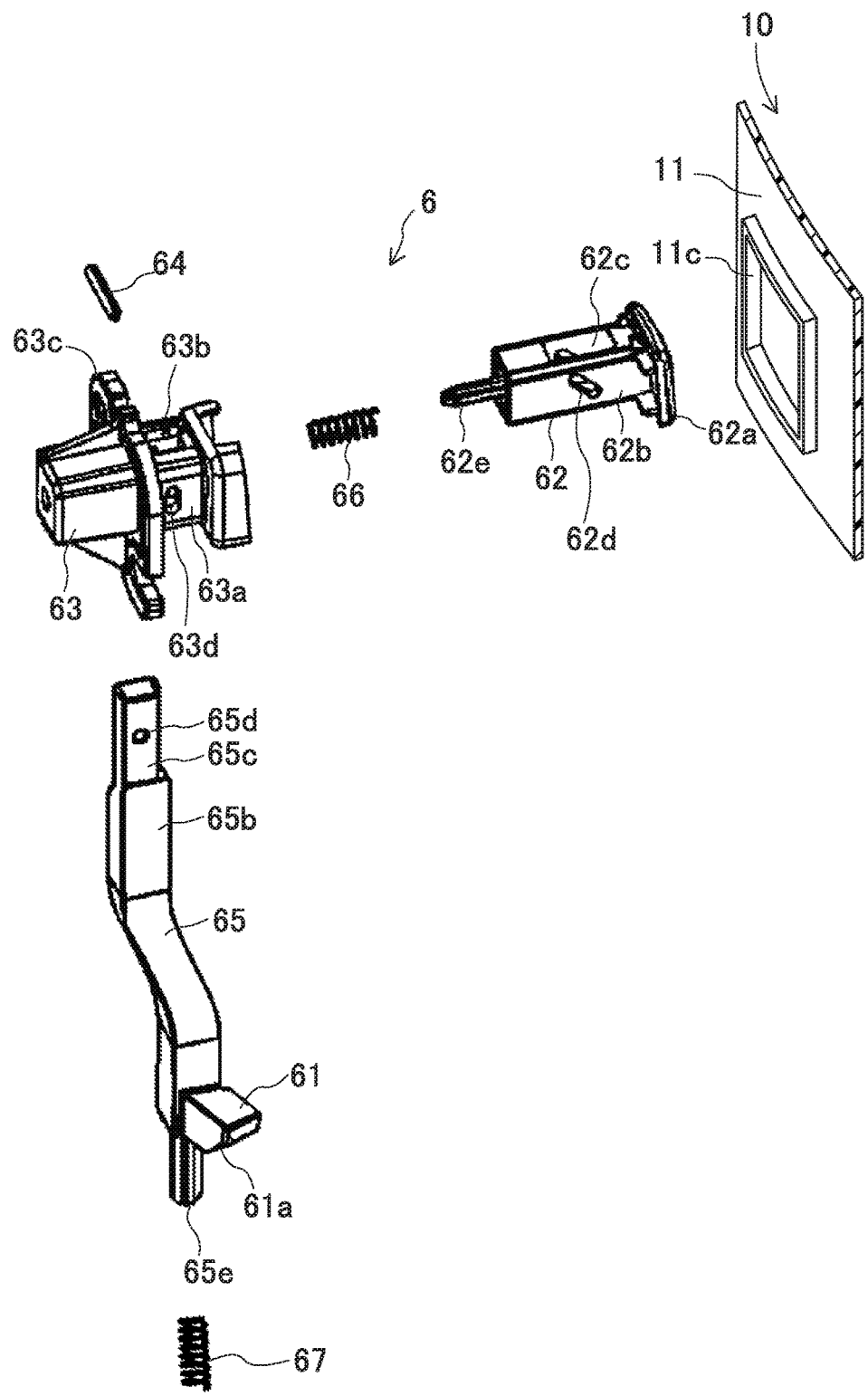
FIG. 8 is an exploded perspective view of an operating part according to the first embodiment.

As depicted in FIGS. 3 and 8, the lock mechanism 5 locks the tray 2 at the lowermost position. The lock mechanism 5 includes the lock member 51, the inhibitor 61, a lock energizing member 56, and the operating part 6.

Figure 9:
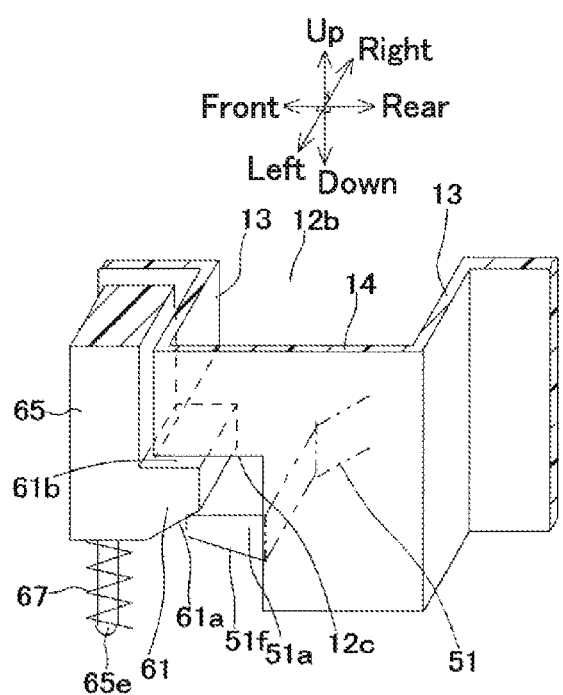
FIG. 9 is a partial perspective view of an inhibitor and a groove according to the first embodiment.

As depicted in FIGS. 3 and 9, the lock member 51 has a tabular shape and includes a rotation center 51c protruding upward and downward, a pair of arms 51b extending oppositely from the rotation center 51c, and the latch portions 51a provided at the distal ends of the arms 51b. Each of the latch portions 51a has a tapered lower surface 51f slanting upward toward the inhibitor 61.

As depicted in FIGS. 2 and 3, the lock member 51 is provided thereabove and therebelow with an upper cover 52 and a lower cover 53, respectively. The lock member 51 is disposed between the upper cover 52 and the lower cover 53, and the protruded rotation center 51c of the lock member 51 is inserted through a center hole 52a of the upper cover 52 and a center hole 53a of the lower cover 53. In this state, screws 59 are inserted through bosses 53b of the lower cover 53 and screw holes 52b of the upper cover 52 and screwed to screw holes 26 of the tray 2. The lock member 51 is thus rotatably held to the tray 2. The latch portions 51a of the lock member 51 are disposed in the second grooves 12b.

As depicted in FIG. 3, the lock energizing member 56 is a torsion coil spring. The lock energizing member 56 has a first end latched to a spring holding part 51g provided at one of the arms 51b of the lock member 51 and a second end latched to a protruded portion 53c of the lower cover 53. The lock energizing member 56 energizes the lock member 51 to latch the lock member 51 to the inhibitor 61. The lock energizing member 56 according to the present embodiment energizes the lock member 51 to rotate the lock member 51 rightward (clockwise).

As depicted in FIG. 8, the operating part 6 includes a knob 62, a case 63, a supporting shaft 64, and an operating rod 65. The operating part 6 is disposed outside the peripheral wall 11 of the holder body 1 and adjacent to one of the second grooves 12b (FIG. 4). The knob 62 includes a press portion 62a, a slide portion 62b protruding from the press portion 62a, a fit through hole 62c provided at the slide portion 62b and penetrating vertically, and play holes 62d provided in respective side surfaces of the slide portion 62b. The knob 62 is disposed retreatably in an operation hole 11c provided at the peripheral wall 11 of the holder body 1 (FIG. 5). The press portion 62a of the knob 62 is exposed through the operation hole 11c to the accommodation space 10, and the slide portion 62b is directed outward from the peripheral wall 11.

The play holes 62d serve as guide holes slanting upward to be away from the accommodation space 10 (radially outward from the holder body 1). The case 63 includes a tubular accommodation portion 63a allowing the slide portion 62b of the knob 62 to be retreatably inserted thereto, an insertion hole 63b vertically penetrating the accommodation portion 63a, and a flange portion 63c expanding outward from the accommodation portion 63a. The accommodation portion 63a is provided, in each side surface, with a long hole 63d extending vertically. A spring 66 is provided between a back surface of the slide portion 62b of the knob 62 and a back surface of the accommodation portion 63a of the case 63. The spring 66 is outserted to a spring holding part 62e protruding from a rear surface of the knob 62. The spring 66 energizes the knob 62 from the operation hole 11c of the holder body 1 toward the accommodation space 10.

The operating rod 65 includes a long portion 65b, a coupling portion 65c provided at the top of the long portion 65b and smaller in width than the long portion 65b, and a supporting hole 65d provided at the coupling portion 65c. The operating rod 65 is provided, at the lower end, with a spring holding part 65e having a thin columnar shape. A return spring (compression spring) 67 is outserted to the spring holding part 65e. The return spring 67 is a compression coil spring disposed between the outer peripheral edge of the bottom plate 8 of the holder body 1 and a lower portion of the operating rod 65, and energizes the operating rod 65 upward.

The return spring 67 and the lock energizing member 56 are balanced in terms of energizing force such that swinging force of the lock member 51 by the lock energizing member 56 is smaller than upward returning force of the inhibitor 61 by the return spring 67.

The slide portion 62b of the knob 62 is accommodated in the accommodation portion 63a of the case 63 to assemble the operating part 6. The coupling portion 65c of the operating rod 65 is inserted to the insertion hole 63b of the case 63. The supporting shaft 64 is inserted through the play holes 62d of the slide portion 62b, the long holes 63d of the accommodation portion 63a, and the supporting hole 65d of the operating rod 65. Snap rings (not depicted) serving as retainers are fitted to the respective ends of the supporting shaft 64. The operating part 6 is thus achieved by integrating the knob 62, the case 63, the operating rod 65, and the supporting shaft 64.

As depicted in FIG. 9, the inhibitor 61 is provided at a lower portion of the operating rod 65. The inhibitor 61 protrudes backward from the lower portion of the operating rod 65. The inhibitor 61 has a tapered surface 61a at the bottom and slanting upward toward its distal end. The operating rod 65 is disposed outside the peripheral wall 11 of the holder body 1 and adjacent to the left one of the second grooves 12b.

One of the right and left second grooves 12b (the left groove in the present embodiment) is provided at a lower portion with an insertion through hole 12c. The insertion through hole 12c is provided continuously to one of the opposite side walls 13 and the back wall 14 of the second groove 12b.

The inhibitor 61 is configured to be vertically displaced in accordance with operation to the operating part 6. The tapered surface 61a of the inhibitor 61 is separably in contact with the latch portion 51a of the lock member 51.

Behavior of the cup holder according to the present embodiment will be described next. Initially described is the case where the tray 2 is held at the lowermost position. Dotted lines in FIG. 2 indicate the state where the tray 2 is held at the lowermost position. As depicted in FIG. 9, the inhibitor 61 is disposed above the latch portion 51a of the lock member 51 and the latch portion 51a is latched to the inhibitor 61. In this case, the lock member 51 is not shiftable upward and the tray 2 is locked at the lowermost position in the accommodation space 10.

As depicted in FIG. 8, when the press portion 62a of the knob 62 is pressed into the operation hole 11c, the knob 62 slides radially outward. The supporting shaft 64 is shifted downward relatively to the play holes 62d of the knob 62. Along with the supporting shaft 64 shifted downward, the operating rod 65 and the inhibitor 61 are shifted downward. As depicted in FIG. 9, the tapered surface 61a of the inhibitor 61 presses the latch portion 51a of the lock member 51 toward the distal end of the inhibitor 61. The lock member 51 rotates toward the distal end of the inhibitor 61 (backward in FIG. 9) against energizing force of the lock energizing member 56. The latch portion 51a of the lock member 51 is thus shiftable upward in the groove 12b away from the tapered surface 61a of the inhibitor 61. Each of the latch portions 51a shifts upward in the second groove 12b. Specifically, each of the pinion gears 35a is rotated by the energizing member 33 to shift upward along the rack gear 31. As depicted in FIG. 2, the tray 2 is shifted upward in the accommodation space 10.

As depicted in FIG. 2, the pinion gears 35a are connected to the transmitting shaft provided with the speed buffer 37. The speed buffer 37 suppresses sudden change in rotation of the pinion gears 35a. The pinion gears 35a thus rotate slowly to ascend along the rack gears 31. The tray 2 ascends slowly in the accommodation space 10.

Figure 10:
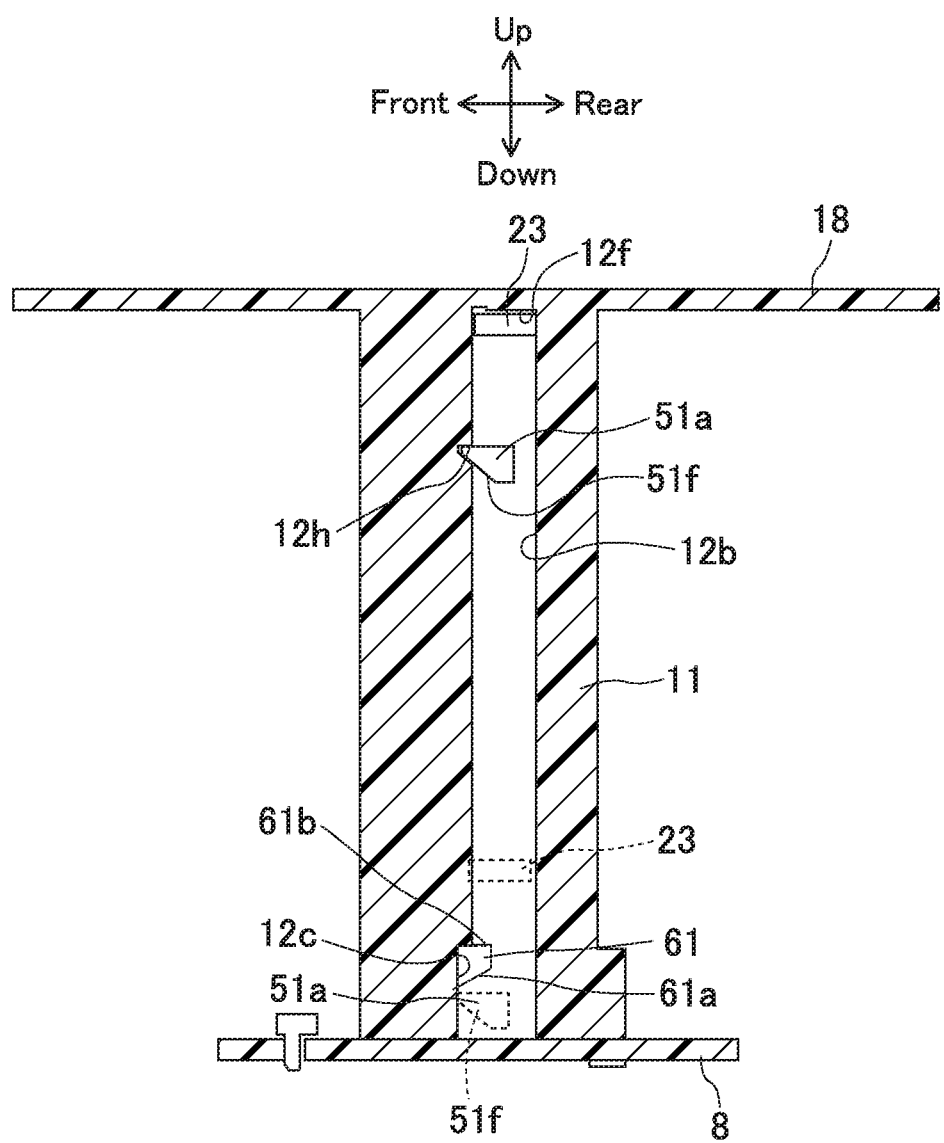
FIG. 10 is a sectional view taken along line E-E indicated in FIG. 4.

When the tray 2 stops at the uppermost position as depicted in FIG. 10, energizing force of the lock energizing member 56 causes the latch portion 51a of the lock member 51 to be inserted to an engagement hole 12h provided at the side wall 13 of the second groove 12b to stop vertical shift of the lock member 51. The engagement hole 12h corresponds to an upper engagement portion according to the present invention. Upward shift of the tray 2 is thus stopped to keep the tray 2 at the uppermost position. As indicated by solid lines in FIGS. 1 and 2, the tray 2 is positioned as high as the upper wall 18 of the holder body 1 in this case. The tray 2 is visually recognized as being integral with the upper wall 18 of the holder body 1 in excellent appearance.

The upper surface of the tray 2 at the uppermost position is positioned as high as the upper wall 18 of the holder body 1 in the present embodiment. The uppermost position of the tray 2 is freely adjusted by vertically changing the height of the engagement hole 12h of the second groove 12b.

The latch portion 51a of the lock member 51 is latched to the engagement hole 12h of the second groove 12b to restrict the uppermost position of the tray 2. Ascending of the tray 2 is restricted alternatively by bringing the protrusions 23 from the peripheral edge of the tray 2 into contact with upper ends 12f of the second grooves 12b.

As depicted in FIGS. 2 and 6, the tray 2 at the uppermost position is pressed downward. Each of the pinion gear 35a then shifts downward along the rack gear 31 against energizing force of the energizing member 33 to shift the tray 2 downward in the accommodation space 10.

As depicted in FIG. 10, the latch portion 51a of the lock member 51 comes into contact with an upper end 61b of the inhibitor 61 protruding from the insertion through hole 12c toward the second groove 12b. The lower surface 51f of the latch portion 51a of the lock member 51 is smoothly tapered. The lock energizing member 56 has energizing force smaller than that of the return spring 67. The latch portion 51a of the lock member 51 thus descends to gradually slide along the upper end 61b of the inhibitor 61 and swing toward the distal end of the inhibitor 61. When the tray 2 is further shifted downward, the latch portion 51a of the lock member 51 separates from the upper end 61b of the inhibitor 61 and shifts downward along the distal end surface of the inhibitor 61 to be disposed below the inhibitor 61. In this case, the lock member 51 is swung toward the inhibitor 61 by energizing force of the lock energizing member 56 to come into contact with the tapered surface 61a of the inhibitor 61. As indicated by dotted lines in FIG. 10, the lock member 51 is latched to the inhibitor 61 to hold the tray 2 at a lower portion in the accommodation space 10.

The inhibitor 61 is provided at the operating rod 65. The insertion through hole 12c provided at the second groove 12b can alternatively serve as an inhibitor. In the case where the insertion through hole 12c serves as an inhibitor, the latch portion 51a of the lock member 51 is latched to the insertion through hole 12c. The operating rod 65 of the operated operating part 6 presses the latch portion 51a out of the insertion through hole 12c to unlatch the latch portion 51a from the insertion through hole 12c.

As depicted in FIG. 2, the tray 2 according to the present embodiment rotatably supports the pinion gears 35a. Each of the pinion gears 35a meshes with the rack gear 31 provided at the peripheral wall 11 of the holder body 1. The pinion gear 35a is rotated on the rack gear 31 to shift upward by energizing force of the energizing member 33. The tray 2 supporting the pinion gears 35a is also shifted upward.

When the tray 2 is pressed downward, each of the pinion gears 35a rotates on the rack gear 31 to shift downward along with the tray 2 against energizing force of the energizing member 33.

The energizing member 33 is provided at the tray 2. The energizing member 33 does not couple the holder body 1 and the tray 2 to hang the tray 2 from the holder body 1. The energizing member 33 according to the present embodiment does not have positional restriction on the ascending tray 2. The tray 2 according to the present invention has higher flexibility in vertical positioning and higher flexibility in setting the uppermost position than the tray 2 of the cup holder 19 disclosed in Japanese Unexamined Patent Publication No. 2015-136976.

The return spring 67 and the lock energizing member 56 are preferably balanced in terms of energizing force such that swinging force of the lock member 51 by the lock energizing member 56 is smaller than upward returning force of the inhibitor 61 by the return spring 67. This configuration prevents shift of the inhibitor 61 even in a case where the lock member 51 comes into contact with the inhibitor 61 while the tray 2 is pressed downward. The inhibitor 61 is prevented from shifting, so that the operating part 6 is not displaced. The lock member 51 is reliably latched to the inhibitor 61 when the tray 2 reaches the lowermost position. The tray 2 can reliably be locked at the lowermost position.

Second Embodiment

Figure 11:
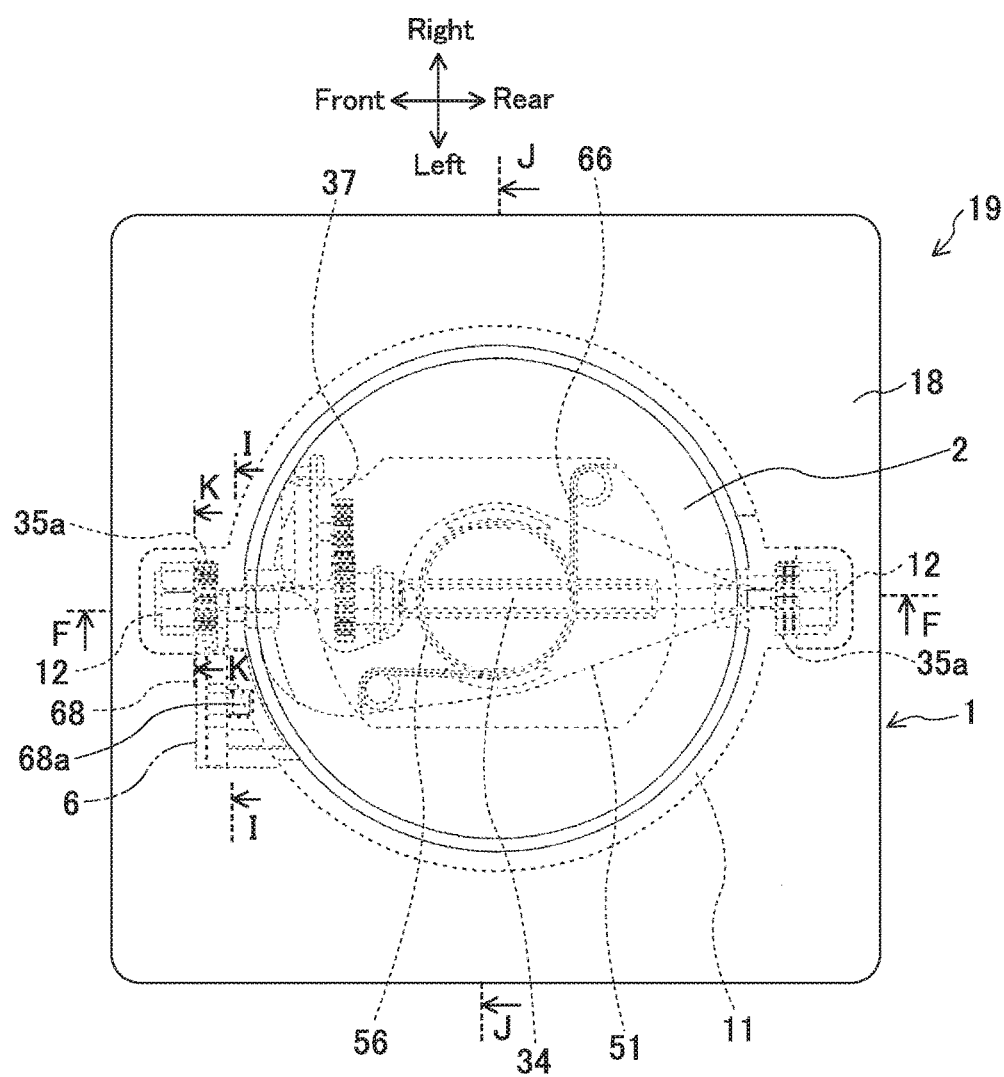
FIG. 11 is a plan view of a cup holder according to a second embodiment.

As depicted in FIG. 11, a cup holder 19 according to the present embodiment is different from the cup holder according to the first embodiment including the peripheral wall 11 provided with the four grooves 12, in that a peripheral wall 11 of a holder body 1 has two grooves 12. Furthermore, the two grooves 12 in the present embodiment accommodate pinion gears 35a provided at a tray 2 and latch portions 51a of a lock member 51.

Figure 12:
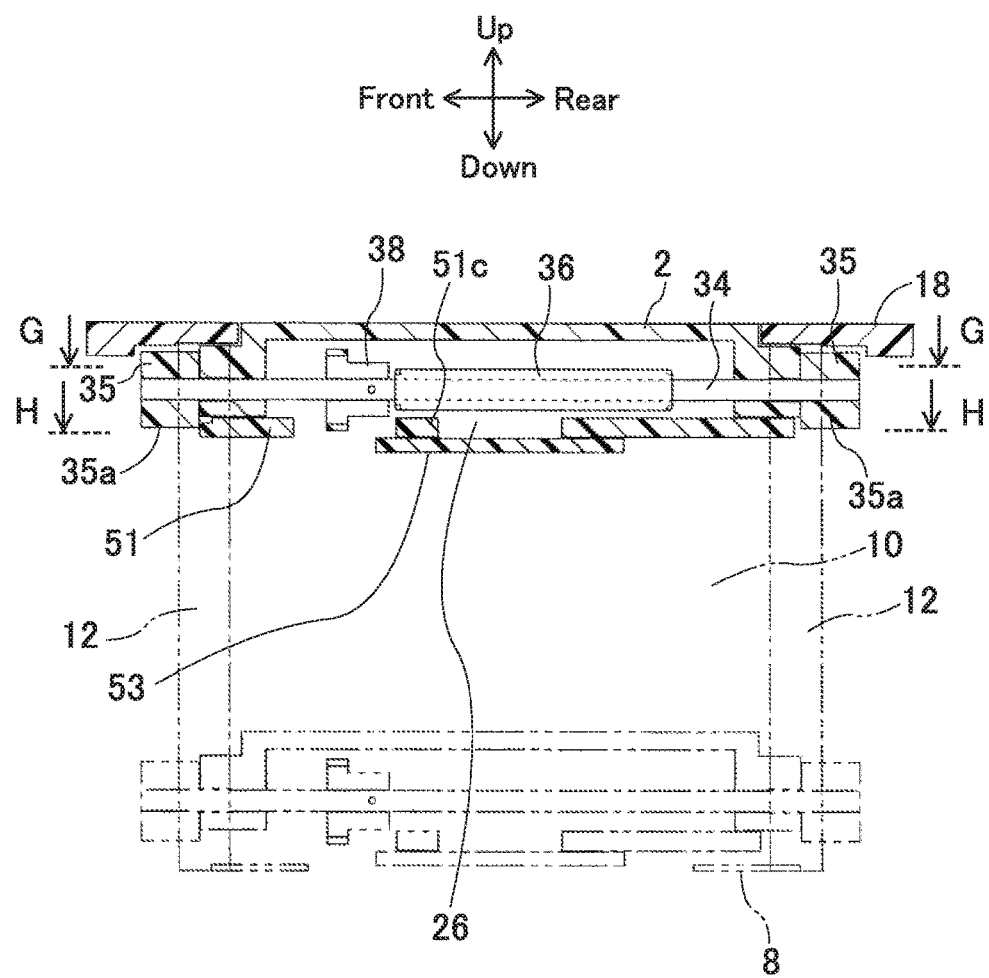
FIG. 12 is a sectional view taken along line F-F indicated in FIG. 11.

As depicted in FIG. 12, the cup holder 19 according to the present embodiment includes a transmitting shaft 34 fixing a pair of gear members 35 having the pinion gears 35a, and the lock member 51, as in the first embodiment. As depicted in FIG. 11, the transmitting shaft 34 and the lock member 51 are disposed below the tray 2 to be in parallel with each other.

Figure 13:
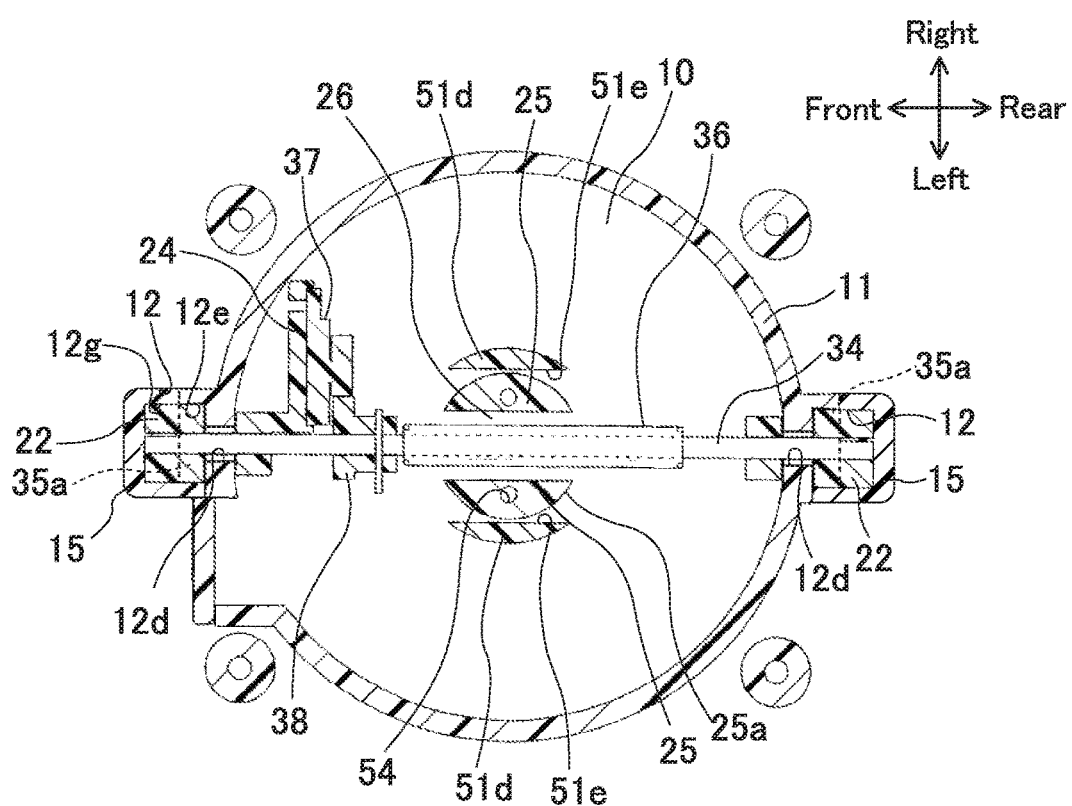
FIG. 13 is a sectional view taken along line G-G indicated in FIG. 12.
Figure 14:
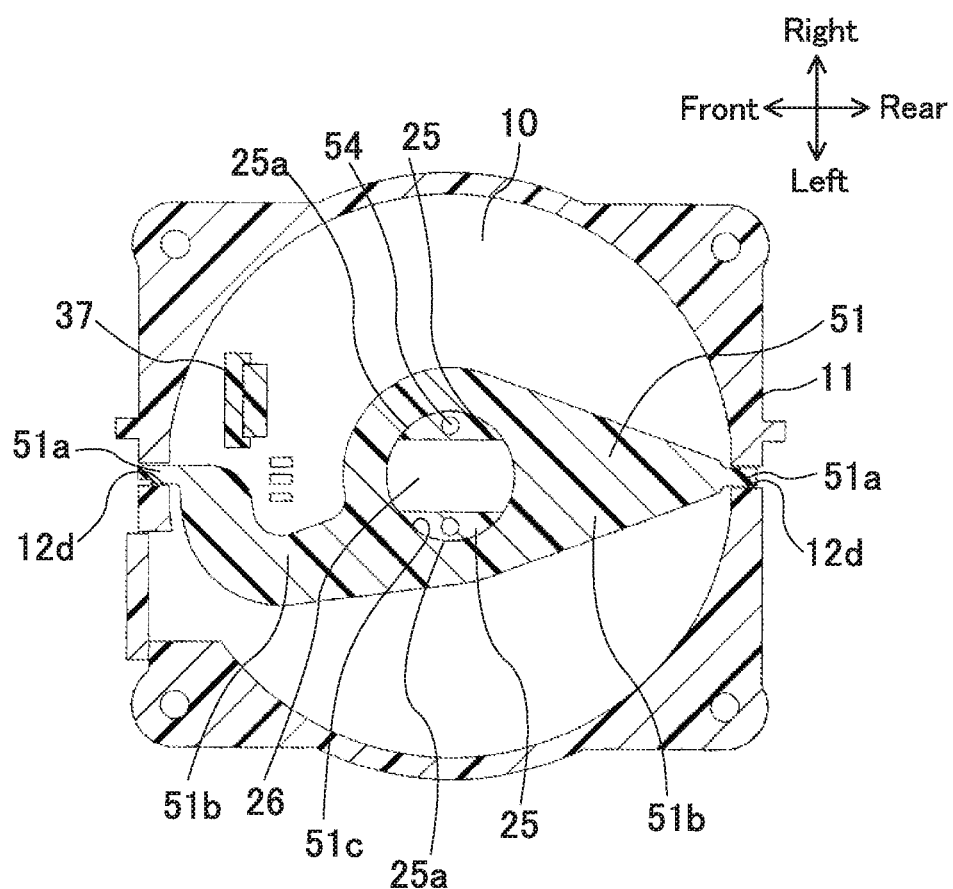
FIG. 14 is a sectional view taken along line H-H indicated in FIG. 12.
Figure 15:
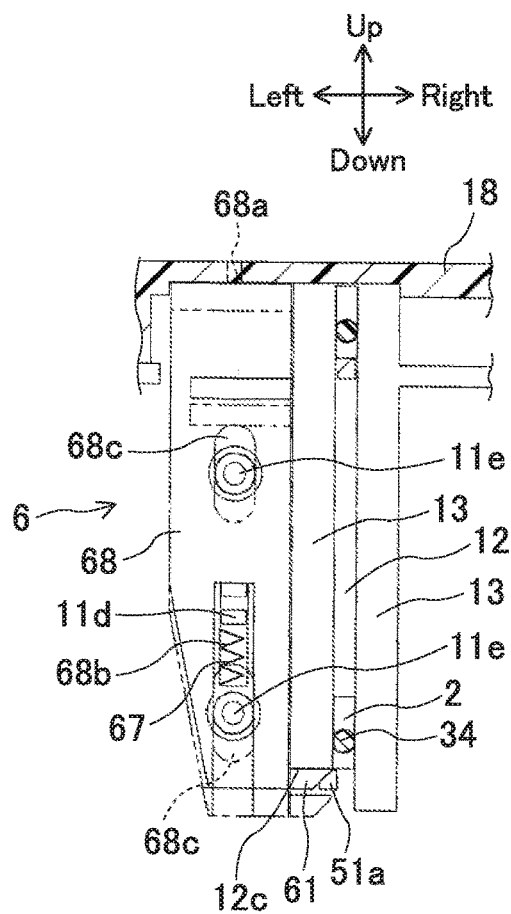
FIG. 15 is a sectional view taken along line I-I indicated in FIG. 11.

As depicted in FIG. 13, each of the pair of grooves 12 has a relatively narrow opening 12d provided in the inner peripheral surface of the peripheral wall 11. As depicted in FIG. 14, the latch portions 51a of the lock member 51 are disposed in the openings 12d. As depicted in FIG. 15, each of the grooves 12 has a pair of side walls 13 and 13, and one of the side walls 13 has a lower end provided with an insertion through hole 12c positioned adjacent to the opening 12d. The insertion through hole 12c is provided therein with an inhibitor 61 as in the first embodiment (see FIG. 6).

Figure 16:
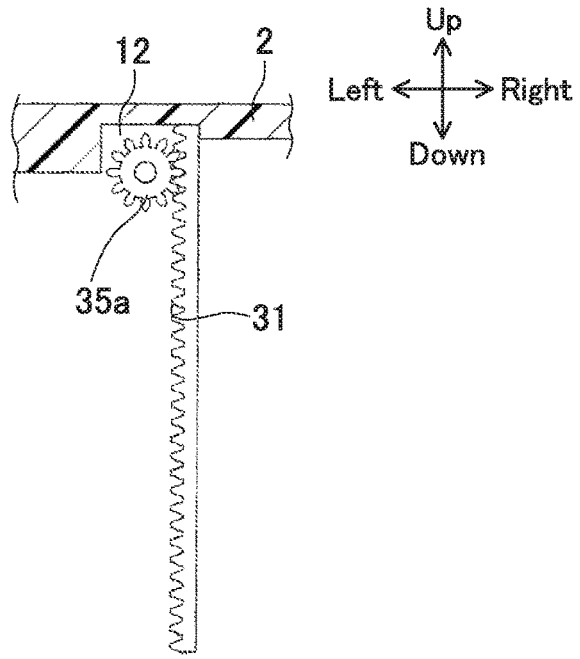
FIG. 16 is a sectional view taken along line K-K indicated in FIG. 11.

As depicted in FIG. 13, the rack member 15 according to the first embodiment is fixed at a position behind the opening 12d in each of the grooves 12. The rack member 15 includes a gear accommodation portion 12e wider than the opening 12d and disposed behind the opening 12d, and a guide accommodation portion 12g disposed behind the gear accommodation portion 12e. As depicted in FIG. 16, one of the side walls 13 at the gear accommodation portion 12e is provided with a rack gear 31. The rack gear 31 meshes with the pinion gear 35a provided at the tray 2.

As depicted in FIG. 13, the guide accommodation portion 12g according to the present embodiment is provided with a guide protruded portion 22 protruding from the tray 2 as in the first embodiment.

As in the first embodiment, a pair of side walls facing the guide protruded portion 22 according to the present embodiment have groove opposite surfaces 16a and 16a, respectively, as depicted in FIG. 7. The pair of groove opposite surfaces 16a and 16a are in planar contact with tray opposite surfaces 22a and 22a of the guide protruded portion 22. The tray 2 includes two guide protruded portions 22 disposed symmetrically with respect to the center of the tray 2. The tray 2 is supported by the holder body 1 at the two guide protruded portions 22 and 22. Each of the guide protruded portions 22 is sandwiched between and in planar contact with the groove opposite surfaces 16a and 16a. The guide protruded portion 22 is thus supported by the pair of groove opposite surfaces 16a and 16a without slanting from the groove 12. The tray 2 will not swing in an accommodation space 10. The holder body 1 according to the present embodiment includes the peripheral wall 11 provided with the two grooves 12 that hold the tray 2 so as not to be swingable. This configuration achieves excellent appearance in the accommodation space 10 with the smaller number of grooves 12. This configuration also achieves a reduction in the number of components.

As depicted in FIG. 15, an operating part 6 includes a long body 68, a press portion 68a provided at the upper end of the long body 68, the inhibitor 61 provided at the lower end of the long body 68, and a spring hole 68b provided at the long body 68. The press portion 68a is disposed retreatably at the outer peripheral edge of the peripheral wall 11 of the holder body 1. The peripheral wall 11 includes a protruded part 11d inserted to the spring hole 68b so as to be relatively vertically shiftable. There is provided a return spring 67 between the protruded part 11d and the lower end of the spring hole 68b. The return spring 67 is a tension coil spring energizing the operating part 6 upward. The long body 68 is provided, at two upper and lower positions, with guide holes 68c and 68c. The peripheral wall 11 includes bosses 11e protruding at positions corresponding to the guide holes 68c. The bosses 11e fit to the guide holes 68c so as to be relatively vertically shiftable. The return spring 67 energizes to shift upward the operating part 6, so that the lower ends of the guide holes 68c come into contact with the bosses 11e and the press portion 68a is positioned flush with the upper wall 18. When the press portion 68a is pressed downward, the operating part 6 descends and the bosses 11e come into contact with the upper ends of the guide holes 68c to inhibit downward shift of the operating part 6.

Figure 17:
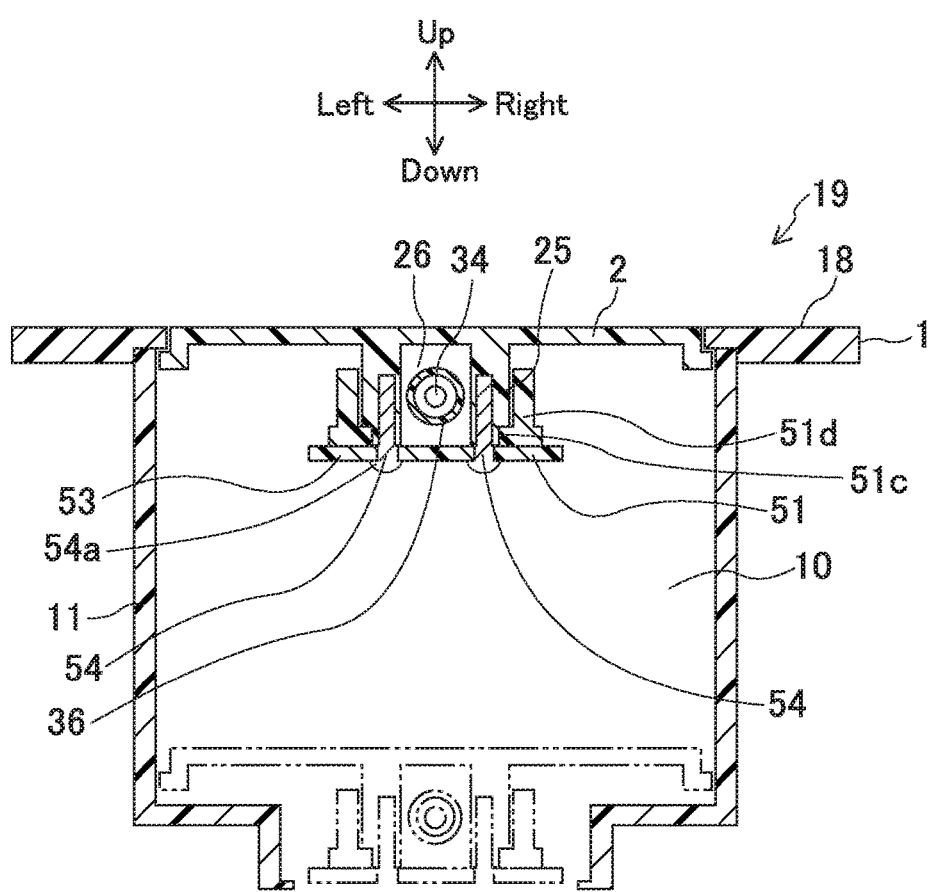
FIG. 17 is a sectional view taken along line J-J indicated in FIG. 11.

As depicted in FIG. 14, the lock member 51 includes a rotation center 51c, a pair of arms 51b extending oppositely from the rotation center 51c, and the latch portions 51a provided at the distal ends of the arms 51b. The rotation center 51c is a circular through hole. As depicted in FIG. 17, the lock member 51 is provided with a pair of lock ribs 51d protruding upward. The tray 2 has a lower surface provided with a pair of tray ribs 25 protruding therefrom. As depicted in FIG. 13, each of the lock ribs 51d has a side surface 51e in contact from outward with the tray rib 25. As depicted in FIGS. 14 and 17, the pair of tray ribs 25 form a space 26 therebetween. The space 26 accommodates the rotatable transmitting shaft 34 surrounded with a collar 36.

As depicted in FIG. 14, each of the tray ribs 25 has an arc surface 25a in contact from inward with the rotation center 51c of the lock member 51. The arc surface 25a is in contact with the opposite side surface 51e of the lock rib 51d to position the lock member 51 so as to be rotatable with respect to the tray 2.

As depicted in FIG. 17, the lock member 51 is provided therebelow with a disc lower cover 53. Each of the lower cover 53 and the tray 2 is provided, in the lower surface, with two screw holes 54. The lock member 51 and the lower cover 53 are disposed in the mentioned order below the tray 2 and screws 54a are fixedly inserted to the screw holes 54, to rotatably hold the lock member 51 to the tray 2.

As depicted in FIGS. 14 and 15, each of the latch portions 51a of the lock member 51 is disposed in the opening 12d of the groove 12. When the tray 2 is located at the lowermost position, the latch portion 51a of the lock member 51 is detachably latched to the inhibitor 61 in the groove 12, as in the first embodiment.

When the press portion of the operating part 6 is pressed downward, the long body 68 and the inhibitor 61 descend and the latch portion 51a of the lock member 51 separates from the inhibitor 61. The inhibitor 61 then becomes ascendable along the groove 12. The pinion gear 35a is rotated to ascend along the rack gear 31 by energizing force of an energizing member 33. The tray 2 then ascends along therewith.

As depicted in FIG. 11, the holder body 1 according to the present embodiment includes the peripheral wall 11 provided with the pair of grooves 12 and 12. The cup holder 19 according to the present embodiment includes the peripheral wall 11 in excellent appearance, in comparison to the cup holder 19 provided with the two pairs of grooves according to the first embodiment The lower cover 53 is provided to hold the lock member 51 to the tray 2 as depicted in FIG. 17, while no upper cover 52 is provided to partition between the lock member 51 and the transmitting shaft 34. The present embodiment thus achieves a further reduction in the number of assembling steps in comparison to the first embodiment.

Third Embodiment

Figure 18:
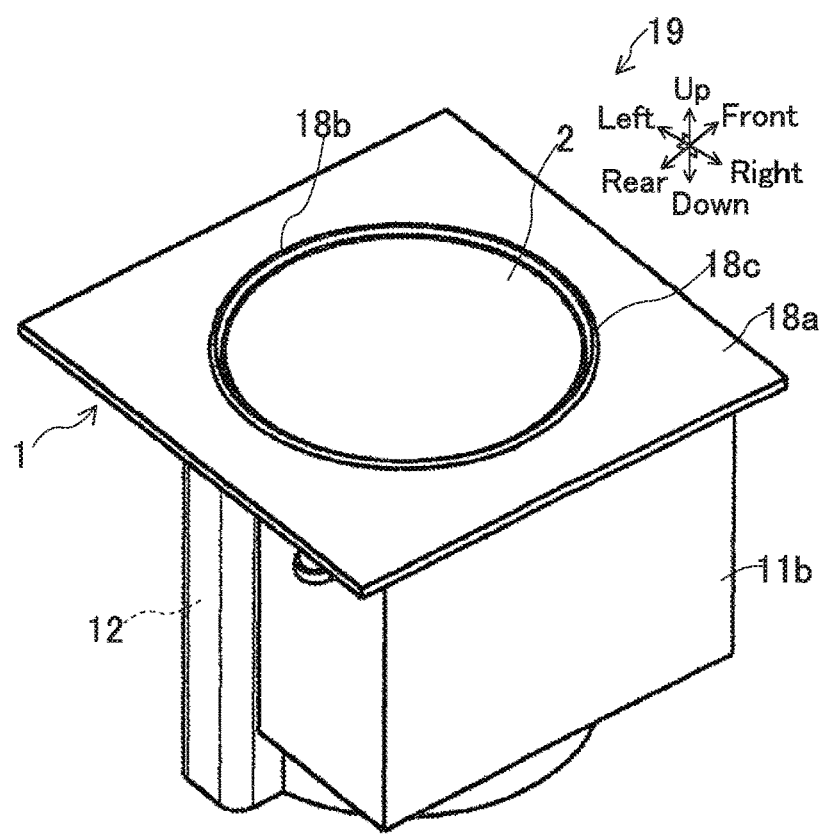
FIG. 18 is a perspective view of a cup holder according to a third embodiment, including a tray located at the uppermost position.
Figure 19:
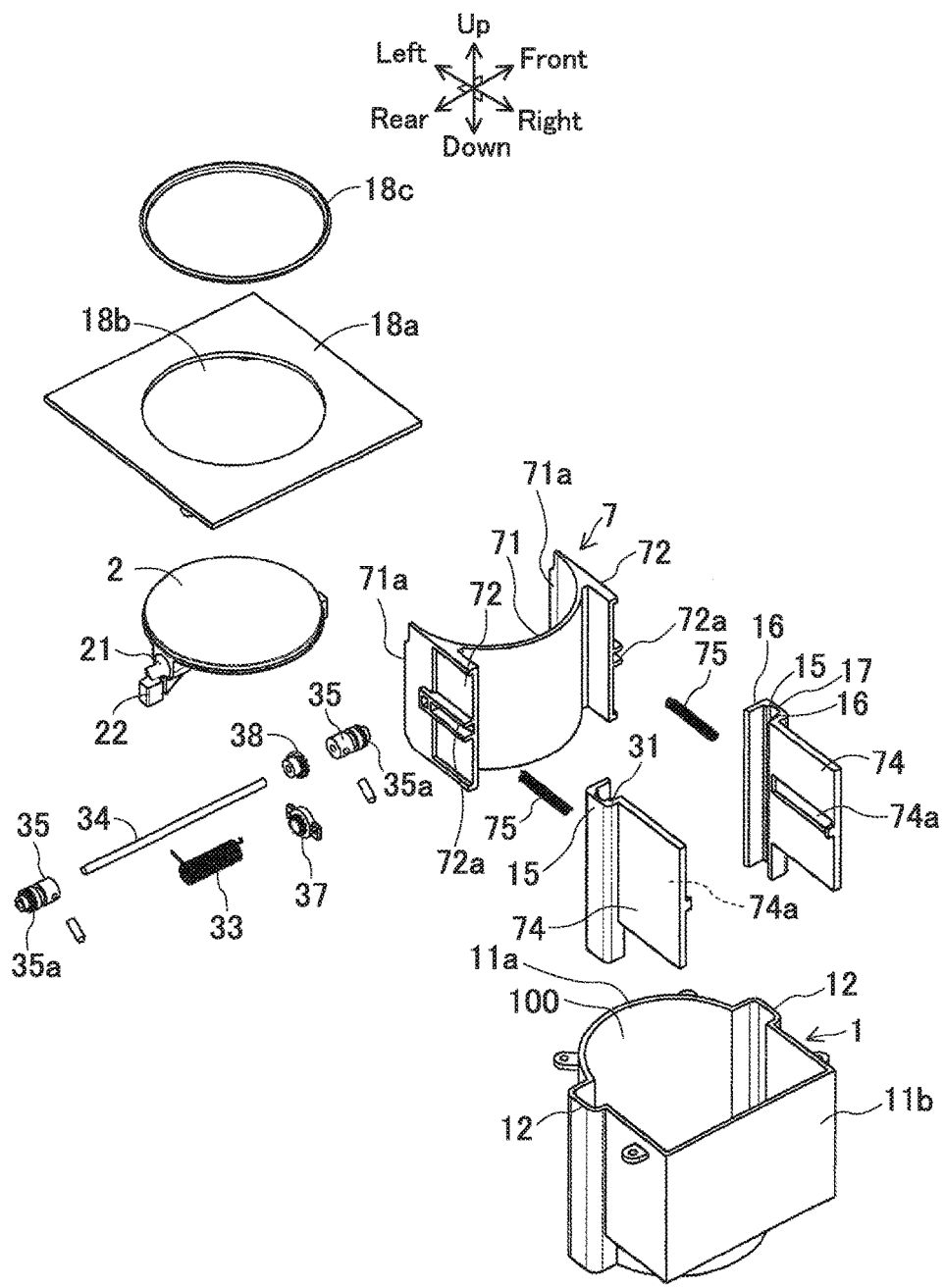
FIG. 19 is an exploded perspective view of the cup holder according to the third embodiment.

As depicted in FIGS. 18 and 19, the present embodiment is different from the first embodiment in that a cup holder 19 is provided with a movable wall 71 openably covering grooves 12 of a holder body 1 and includes neither the lock member 51 nor the operating part 6 of the first embodiment.

Figure 20:
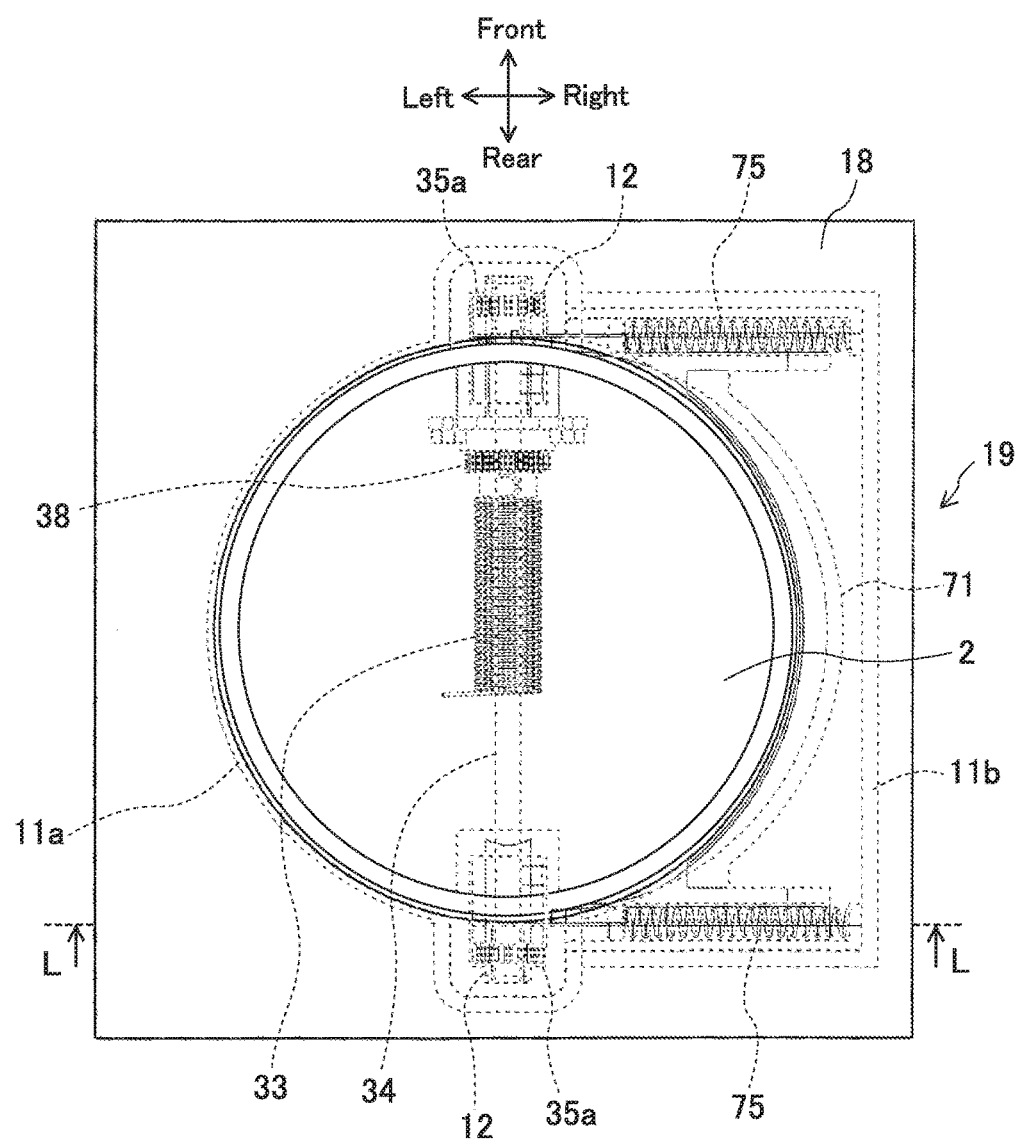
FIG. 20 is a plan view of the cup holder according to the third embodiment.

As depicted in FIG. 20, the holder body 1 includes the pair of grooves 12 and 12 provided at opposite front and rear positions, a semitubular fixed wall 11a provided on the left of the pair of grooves 12 and 12, a rectangular accommodation wall 11b provided on the right of the pair of grooves 12 and 12, and a space 100 surrounded with the fixed wall 11a and the accommodation wall 11b. The space 100 is provided, at the peripheral edge of an upper opening, with a decorative panel 18a. The decorative panel 18a has a hole 18b sized identically to an accommodation space 10 accommodating a beverage container. The decorative panel 18a is fixed integrally to an upper wall 18 by a ring member 18c fitting to the inner peripheral surface of the hole 18b and the upper end of the fixed wall 11a.

Figure 21:
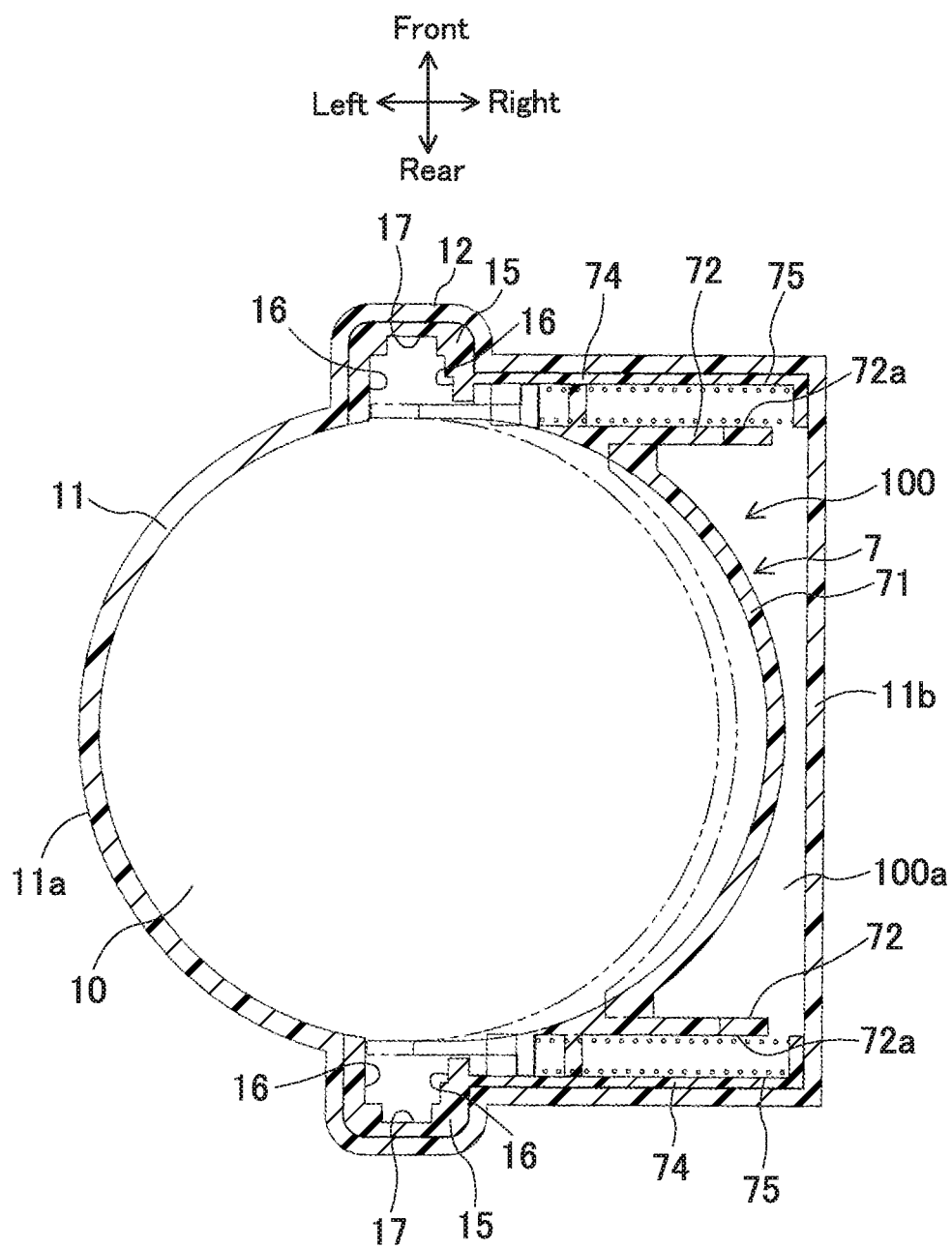
FIG. 21 is a sectional view taken in a planar direction of the cup holder according to the third embodiment.

As depicted in FIG. 21, the space 100 accommodates an inner wall member 7. As depicted in FIG. 19, the inner wall member 7 includes the semitubular movable wall 71, a pair of support walls 72 and 72 extending rightward from the respective ends of the movable wall 71, and spring accommodation grooves 72a each extending horizontally at the support wall 72. The grooves 12 are provided, on the right, with the movable wall 71 of the inner wall member 7, and are provided, on the left, with the fixed wall 11a. The movable wall 71 and the fixed wall 11a configure a peripheral wall 11 surrounding the accommodation space 10 for a beverage container.

Figure 24:
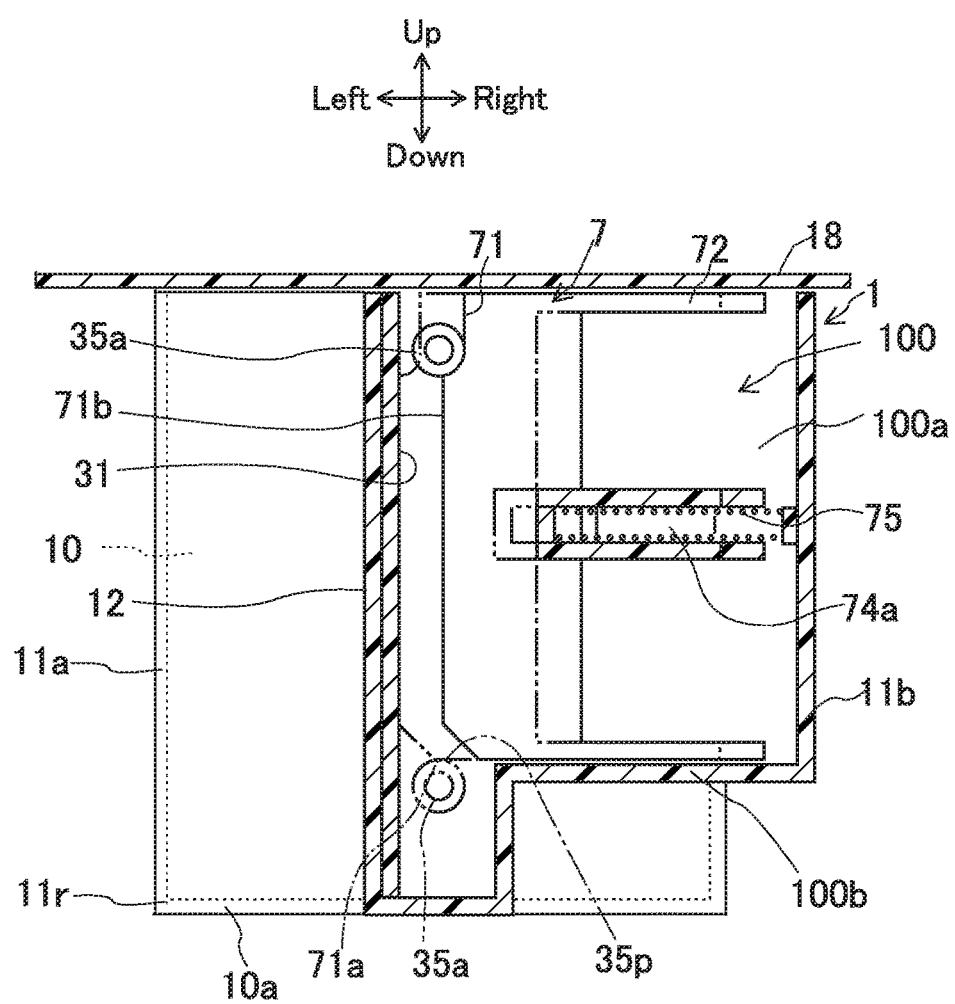
FIG. 24 is a sectional view taken along line L-L indicated in FIG. 20.

As depicted in FIG. 24, the accommodation wall 11b surrounds a space 100a and is provided with a bottom wall 100b disposed at a higher position than a bottom wall 10a of the accommodation space 10. The inner wall member 7 is accommodated in the space 100a, and the movable wall 71 of the inner wall member 7 has a lower end 71a disposed at a higher position than a lower end 11r of the fixed wall 11a surrounding substantially a half of the periphery of the accommodation space 100.

As depicted in FIG. 19, the pair of support walls 72 and 72 of the inner wall member 7 and the accommodation wall 11b of the holder body 1 sandwich a pair of holding members 74 and 74. Each of the holding members 74 is provided with a spring accommodation groove 74a extending horizontally. The spring accommodation groove 74a of the holding member 74 and the spring accommodation groove 72a of the support wall 72 form a space provided with a wall energizing member 75. The wall energizing member 75 is a compression spring energizing the inner wall member 7 leftward, in other words, toward the fixed wall 11a of the holder body 1.

The holding member 74 has a left end provided integrally with a rack member 15. The rack member 15 is disposed in each of the grooves 12 of the holder body 1. The rack member 15 includes a pair of side walls 16 and 16 facing each other along the periphery of the peripheral wall 11, and a back wall 17 provided radially outside the peripheral wall 11 and between the pair of side walls 16 and 16. One of the side walls 16 and 16 (one at the back in FIG. 19) is provided with a rack gear 31.

As depicted in FIG. 24, the rack gear 31 extends downward beyond the bottom wall 100b of the space 100a. A pinion gear 35a rotates to shift along the rack gear 31 so as to reach below the movable wall 71 disposed in the space 100a.

As depicted in FIGS. 24 and 19, a tray 2 is provided with the pinion gears 35a, a transmitting shaft 34, and a speed buffer 37, as in the first embodiment. Each of the pinion gear 35a meshes with the rack gear 31 and is shiftable vertically along the rack gear 31.

Figure 22:
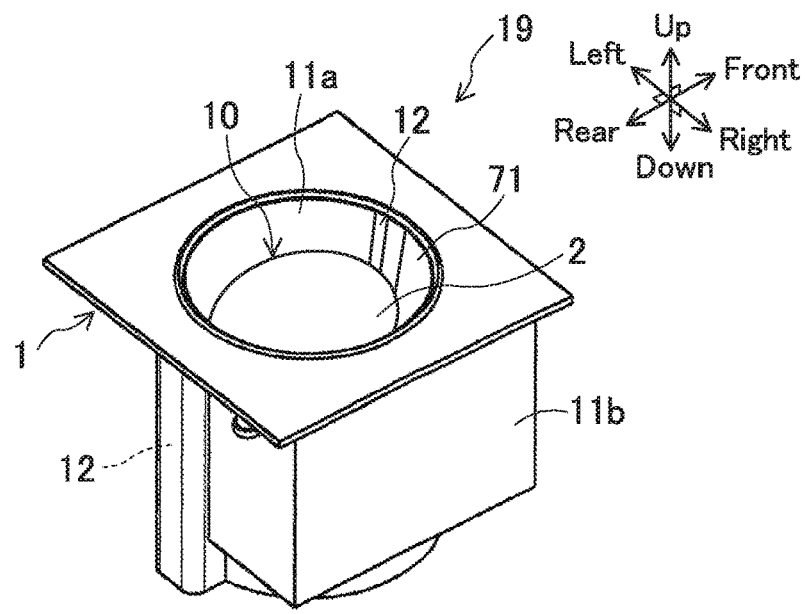
FIG. 22 is a perspective view of the cup holder according to the third embodiment, with the tray being descending.

As depicted in FIGS. 19 and 22, when the tray 2 of the cup holder 19 according to the present embodiment is pressed downward, the pinion gears 35a meshing with the rack gears 31 shift to shift the tray 2 downward. The peripheral lower end of the tray 2 rotatably supports gear members 35 that protrude from the tray 2 toward the grooves 12. The movable wall 71 has a lateral end edge 71b that is in contact with the outer peripheral surfaces of the gear members 35 and retreats rightward to open the grooves 12.

As depicted in FIG. 24, when the tray 2 reaches the lowermost position, the gear members 35 reach below the lower end 71a of the movable wall 71.

Figure 23:
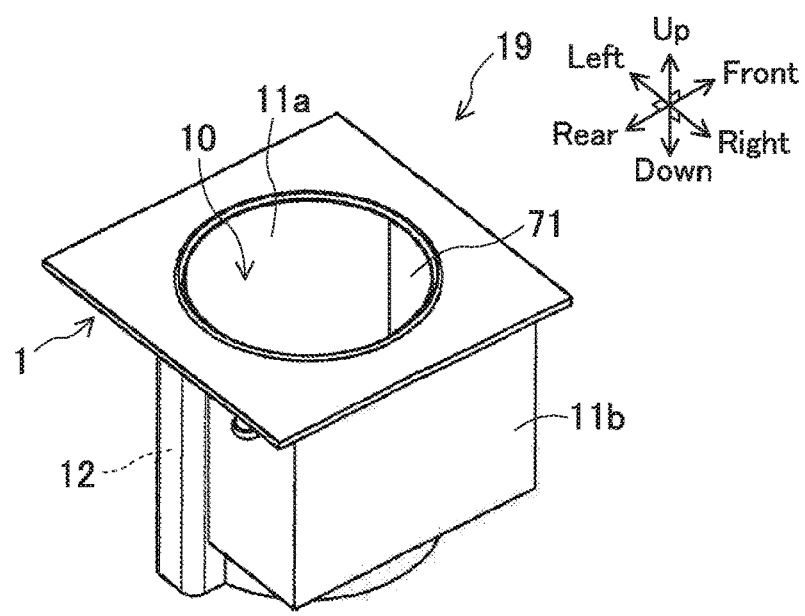
FIG. 23 is a perspective view of the cup holder according to the third embodiment, with the tray located at the lowermost position.

As depicted in FIGS. 23 and 24, when the gear members 35 reach below the lower end 71a of the movable wall 71, the gear members 35 disengage from the movable wall 71. The movable wall 71 is shifted leftward by the wall energizing members 75 to close the grooves 12. The portions covering the grooves 12 of the lower end 71a of the movable wall 71 come into contact with outer peripheral upper ends 35p of the gear members 35 supported by the tray 2, to inhibit the tray 2 from returning upward. The outer peripheral upper end 35p of the gear member 35 corresponds to a contact portion according to the present invention.

When the gear members 35 are in contact with the lower end 71a of the movable wall 71, the grooves 12 are covered with the movable wall 71 so as not to be visually recognized. This configuration achieves excellent appearance of the accommodation space 10. This configuration also prevents entry of foreign matter to the grooves 12.

The movable wall 71 is pressed rightward in order to return the tray 2 upward. The movable wall 71 is shifted rightward to open the grooves 12. The gear members 35 separate from the movable wall 71 and ascend in the grooves 12.

According to the present embodiment, when the tray 2 is disposed at a low position, the grooves 12 are closed by the movable wall 71 so as not to be visually recognized. This configuration achieves excellent appearance of the accommodation space 10. This configuration also prevents erroneous behavior caused by foreign matter entering the grooves 12.

Furthermore, the movable wall 71 itself can be shifted rightward. The present embodiment does not require provision of the lock member 51 and the operating part 6 according to the first embodiment, to achieve a reduction in the number of components.

Fourth Embodiment

Figure 25:
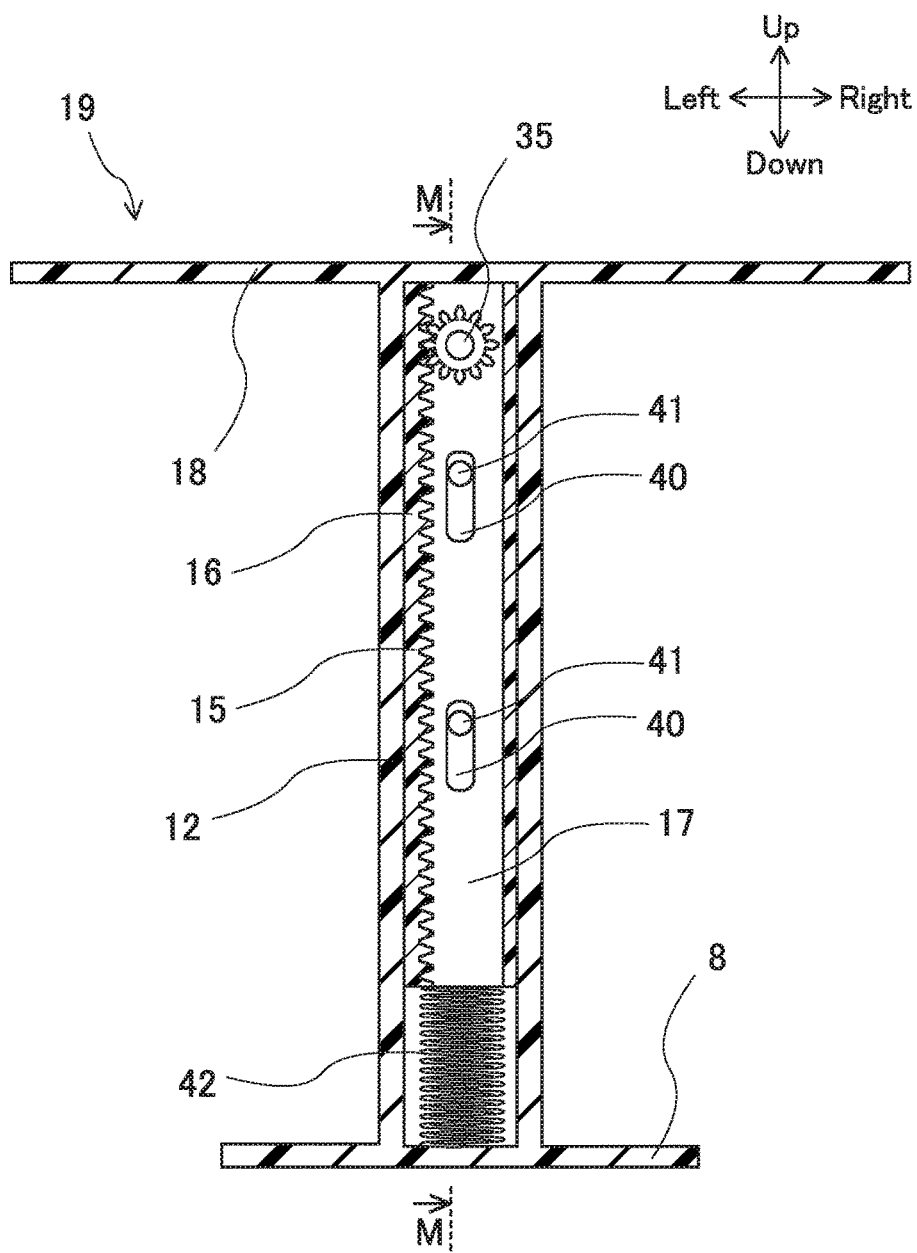
FIG. 25 is a plan view depicting a configuration of a guide member according to a fourth embodiment.
Figure 26:
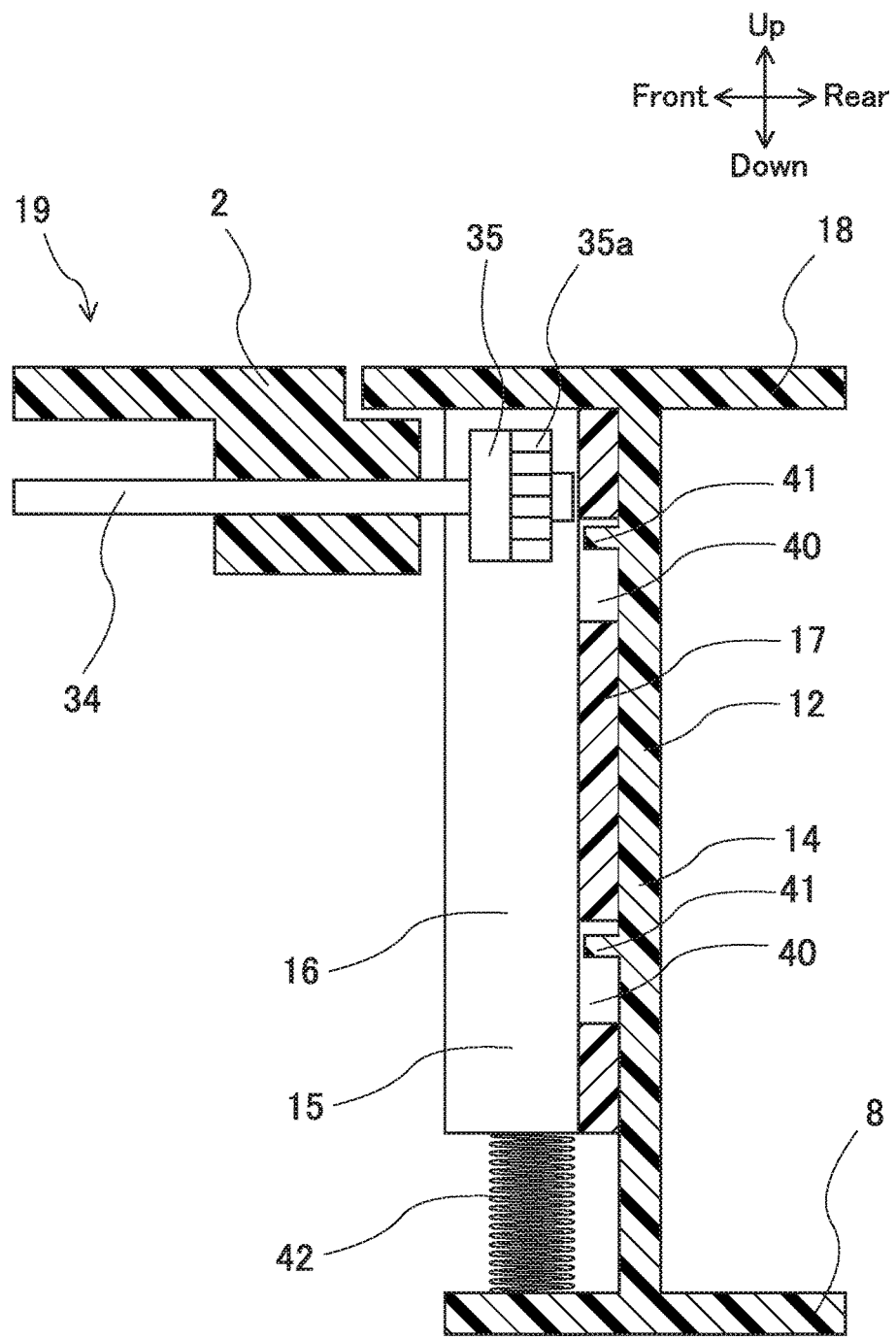
FIG. 26 is a sectional view taken along line M-M indicated in FIG. 25.

In a cup holder 19 according to the present embodiment, a rack member 15 energized upward is disposed in a groove 12 as depicted in FIGS. 25 and 26. The present embodiment is thus different from the first embodiment providing the rack member 15 fitting to the groove 12.

As depicted in FIG. 26, the rack member 15 has a back wall 17 provided with guide holes 40. The guide holes 40 extend vertically and are provided at two positions on the back wall 17. The guide holes 40 receive protruded portions 41 provided on a back wall 14 of the groove 12. The protruded portions 41 protrude radially inward from the back wall 14. Each of the protruded portions 41 inserted to the guide holes 40 has a distal end surface positioned radially outside the inner peripheral surface of the back wall 17 of the rack member 15.

The rack member 15 is disposed vertically shiftably (or slidably) in the groove 12.

As depicted in FIGS. 25 and 26, the rack member 15 is provided therebelow with a spring 42. The spring 42 being compressed has an upper end fixed to the rack member 15 and a lower end fixed to a holder body 1. The upper end of the spring 42 is fixed to the lower end of the rack member 15. The lower end of the spring 42 is fixed to a bottom plate 8 of the holder body 1.

The spring 42 generates force of energizing the rack member 15 upward. The energizing force of the spring 42 is smaller than energizing force generated by a coil spring of an energizing member 33. The energizing force of the spring 42 is preferably at most 90%, more preferably at most 75%, of the energizing force of the energizing member 33.

The spring 42 energizes the rack member 15 upward. The spring 42 presses upward and holds the rack member 15 that is vertically shiftable in the groove 12.

Behavior of the cup holder 19 according to the present embodiment will be described next. Behavior not particularly mentioned is similar to that according to the first embodiment.

Figure 27:
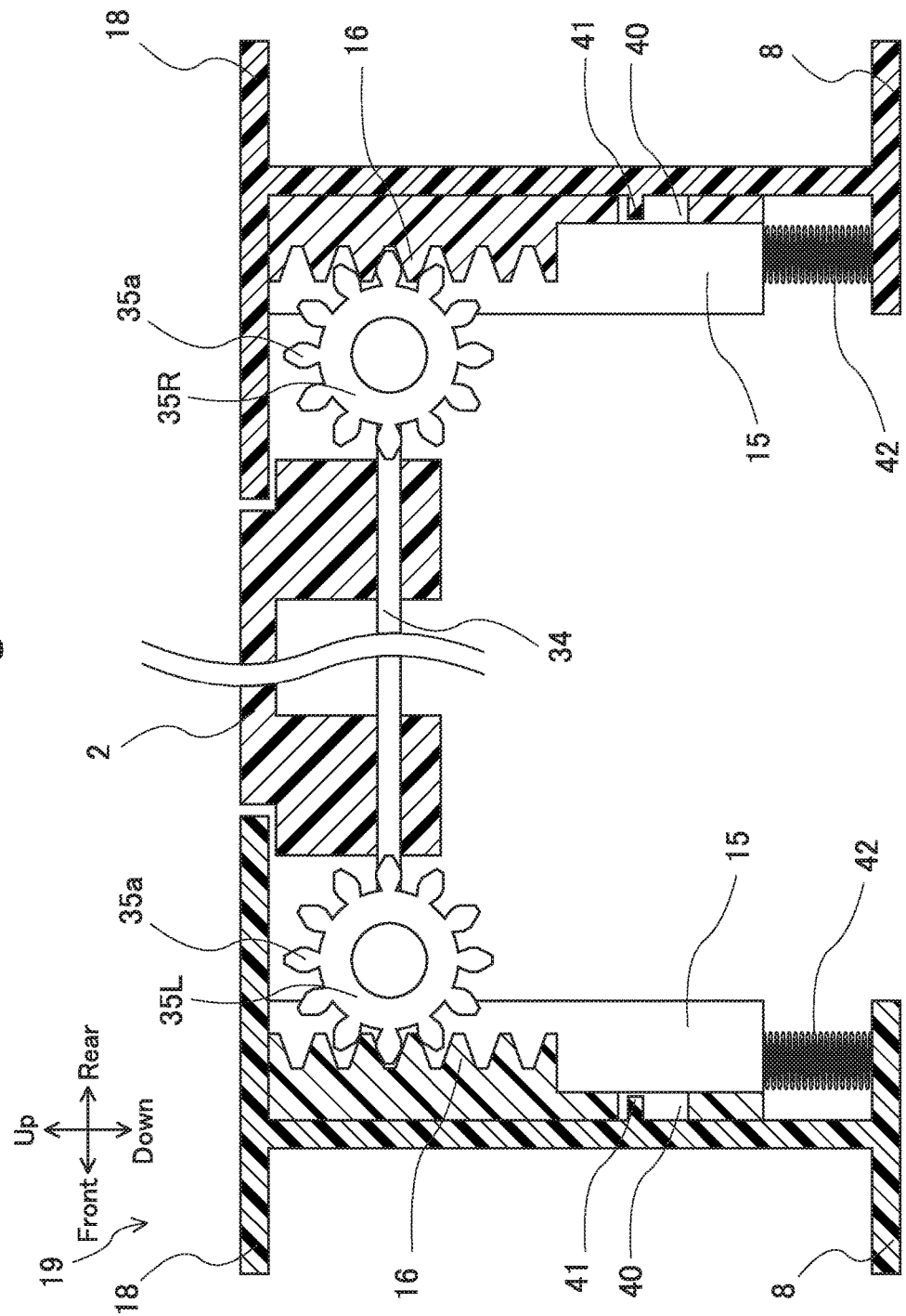
FIG. 27 is a schematic view depicting configurations of rack members, gear members, and a transmitting shaft according to the fourth embodiment.

As depicted in FIG. 26, the cup holder 19 according to the present embodiment includes a tray 2 that is pressed upward by the coil spring of the energizing member 33 and stops at the uppermost position. The rack member 15 is pressed by the spring 42 against an upper wall 18 provided thereabove in this state. The rack members 15 and gear members 35 are identical in phase at the respective ends of a transmitting shaft 34. As depicted in FIG. 27, the transmitting shaft 34 extends horizontally in this case. The tray 2 then expands as high as the upper wall 18 of the holder body 1 to achieve excellent appearance.

Figure 28:
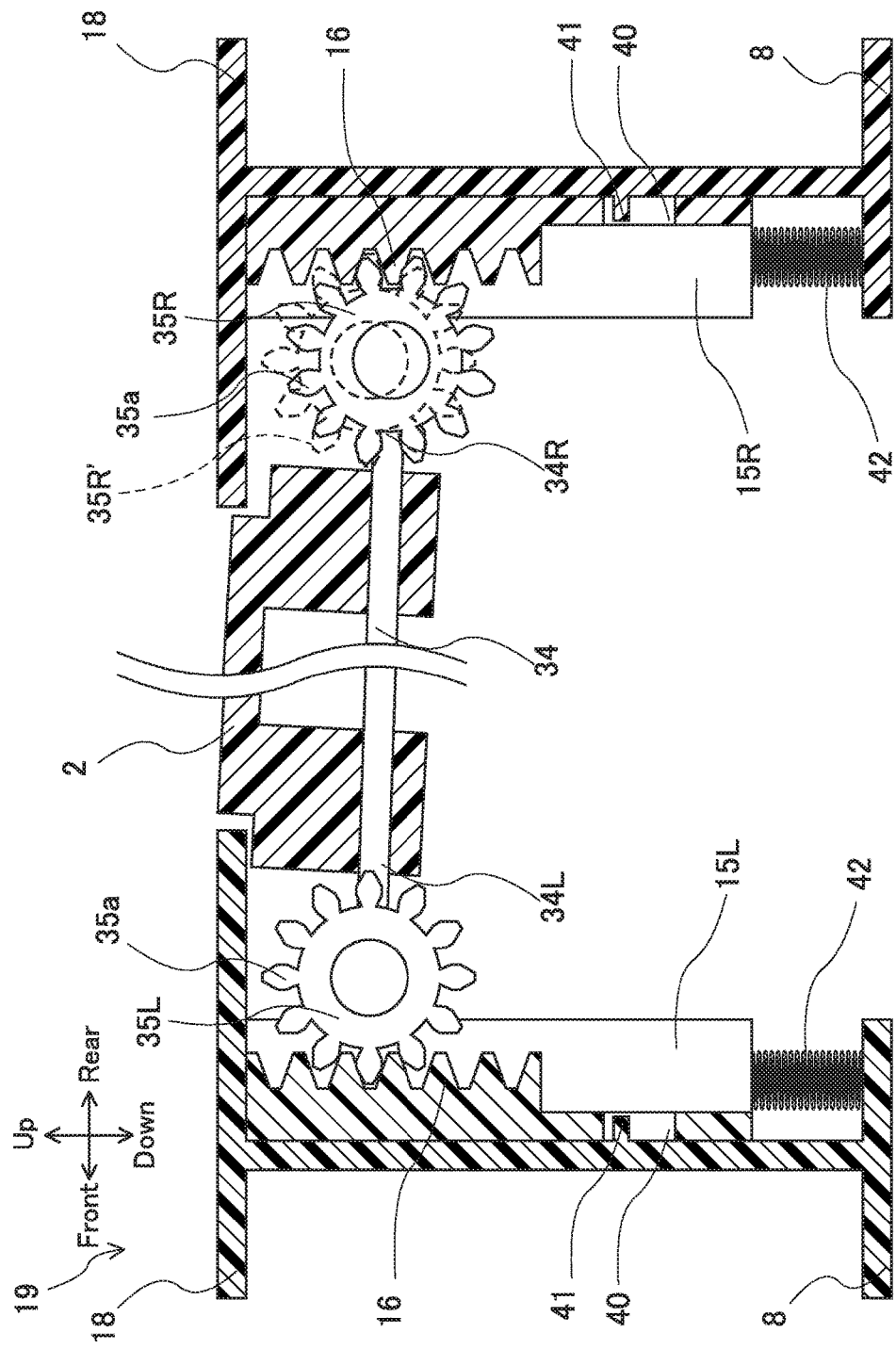
FIG. 28 is another schematic view depicting the configurations of the rack members, the gear members, and the transmitting shaft according to the fourth embodiment.

As depicted in FIG. 28, the transmitting shaft 34 slants if the rack members 15 and the gear members 35 are different in phase at the respective ends of the transmitting shaft 34. The tray 2 then slants to cause a difference in height from the upper wall 18 and deteriorate appearance.

As depicted in FIG. 28, pinion gears 35a of the gear members 35 are different in phase at the respective ends of the transmitting shaft 34. Specifically, the transmitting shaft 34 has a right end 34R (a right gear member 35R) in FIG. 28 located at a lower position than a left end 34L (a left gear member 35L). FIG. 28 indicates, with broken lines, the position of a right gear member 35R' having no difference in phase.

A right rack member 15R and a left rack member 15L are pressed against the upper wall 18 with weak energizing force by the springs 42. FIG. 28 depicts a state where the transmitting shaft 34 has energizing force of pressing the tray 2 upward from the coil spring of the energizing member 33. The tray 2 pressed up to the uppermost position is inhibited from shifting further upward by the holder body 1. The transmitting shaft 34 keeps causing energizing force of pressing the tray 2 upward in this case.

The left end 34L (and the left gear member 35L) of the transmitting shaft 34 is inhibited from shifting upward by the tray 2. The left end 34L (and the left gear member 35L) of the transmitting shaft 34 is inhibited from further rotating for upward shift.

Rotating force is applied also to the right end 34R of the transmitting shaft 34. The right end 34R of the transmitting shaft 34 does not have force inhibiting rotation due to slant of the transmitting shaft 34. Specifically, the tray 2 is not in contact with the upper wall 18 of the holder body 1. The tray 2 is then shiftable until coming into contact with the upper wall 18 of the holder body 1. In this state, the right end 34R (the right gear member 35R) of the transmitting shaft 34 is allowed to further rotate so that the tray 2 shifts until coming into contact with the upper wall 18 of the holder body 1.

This allows the right end 34R (and the right gear member 35R) of the transmitting shaft 34 to further rotate to press the tray 2 upward.

The right end 34R of the transmitting shaft 34 then rotates to press the tray 2 upward. Rotation of the right end 34R (and the right gear member 35R) causes rotation of the left end 34L (and the left gear member 35L) via the transmitting shaft 34. Even though the left end 34L (and the left gear member 35L) tends to rotate, the tray 2 at the uppermost position will not further shift.

Figure 29:
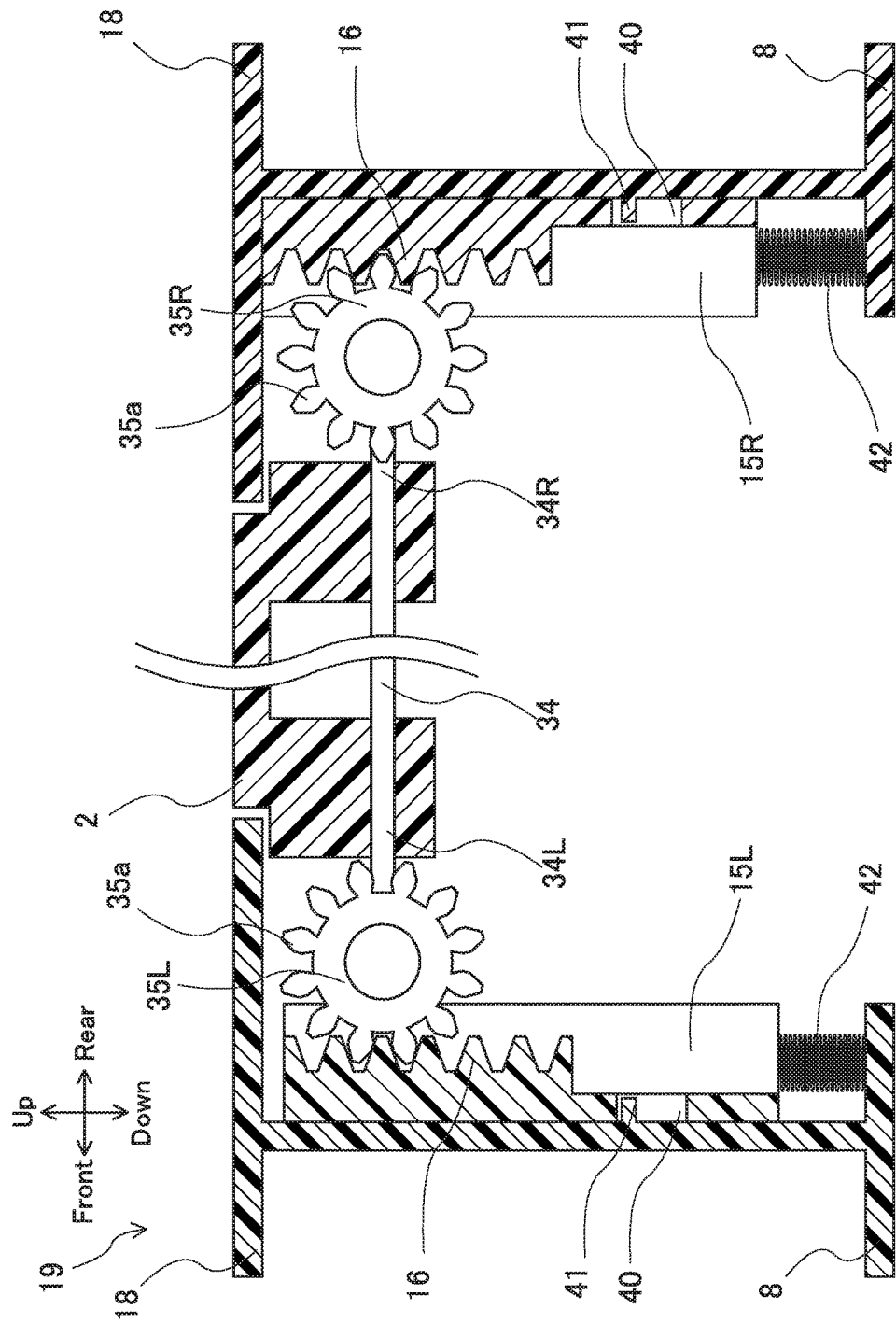
FIG. 29 is still another schematic view depicting the configurations of the rack members, the gear members, and the transmitting shaft according to the fourth embodiment.
Figure 30:
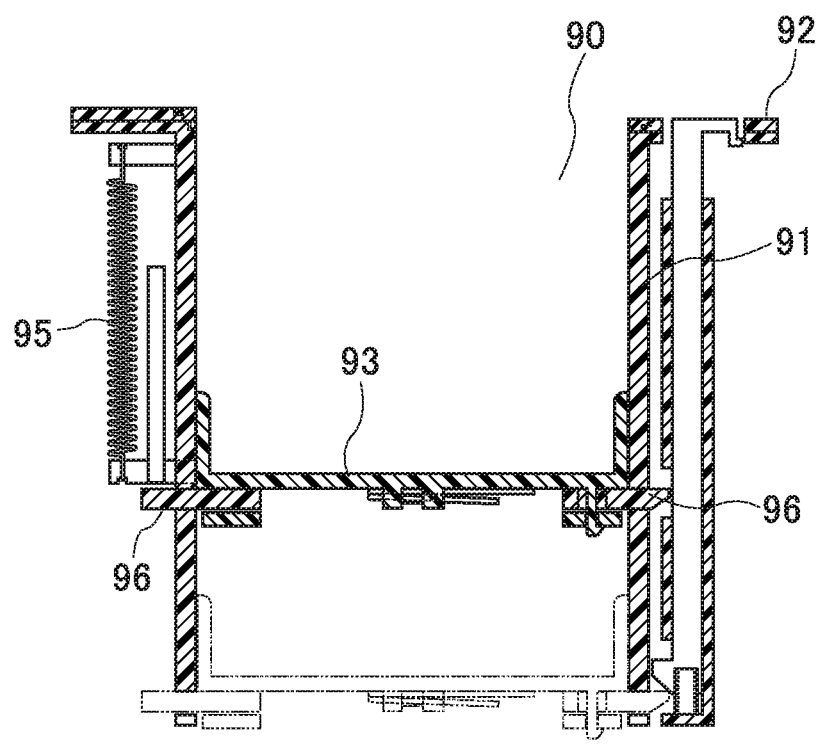
FIG. 30 is a sectional view of a conventional cup holder.

The left end 34L (and the left gear member 35L) generates force of shifting the left rack member 15L downward due to rotation of the transmitting shaft 34. The left rack member 15L receives energizing force of the spring 42 and is pressed against the upper wall 18. The energizing force of the spring 42 is smaller than the energizing force generated by the coil spring of the energizing member 33. When force generated by rotation of the transmitting shaft 34 exceeds the energizing force of the spring 42, the left gear member 35L is pressed downward to shift. The left gear member 35L is pressed downward as depicted in FIG. 29. The left end 34L is located at a position corresponding to the uppermost position of the tray 2.

As described above, the cup holder 19 according to the present embodiment includes the tray 2 disposed as high as the upper wall 18 of the holder body 1 in excellent appearance even in the case where the rack members 15 and the gear members 35 at the respective ends of the transmitting shaft 34 have phase shift. This effect is exerted particularly in a case where phase shift of the rack members 15 and the gear members 35 is less than pitches of the teeth of the pinion gears 35a or rack gears 31.

In the cup holder 19 according to the present embodiment, the protruded portions 41 and the guide holes 40 are alternatively switched in provided position. Specifically, the protruded portions 41 and the guide holes 40 can be provided at the rack members 15 and the grooves 12, respectively.

The protruded portions 41 and the guide holes 40 are not limited in the numbers thereof. The protruded portions 41 and the guide holes 40 can be set in terms of their numbers so as to guide along vertical shift of the rack members 15.

Each of the guide holes 40 can receive one, or two or more protruded portions 41.

The spring 42 is not particularly limited if it is configured to generate force of energizing the rack member 15 upward. The upper end of the spring 42 is alternatively fixed to a position other than the lower end of the rack member 15.

The spring 42 can be a tension spring with the upper end fixed to the upper wall 18 of the holder body 1 and the lower end fixed to the rack member 15.

Furthermore, the spring 42 can be a member or a device other than the coil spring depicted in FIG. 25. The spring 42 has only to be a member or a device configured to generate force of energizing the rack member 15 upward.

In summary, the cup holder 19 according to the present embodiment preferably includes the protruded portion 41 provided at a first one of the rack member 15 and the groove 12, the guide hole 40 provided at a second one thereof and receiving the protruded portion 41, and an energizing device (the spring 42) energizing the rack member 15 upward.

(1) The cup holder 19 according to the present embodiment includes the holder body 1 having a peripheral wall 11 surrounding an accommodation space 10, the tray 2 provided in the accommodation space 10 and vertically shiftably supported by the peripheral wall 11, and a height adjuster 3 configured to vertically shift the tray 2. The height adjuster 3 includes at least one rack gear 31 extending vertically on the peripheral wall 11, at least one pinion gear 35a rotatably supported by the tray 2 and meshing with the rack gear 31, and the energizing member 33 provided at the tray 2 and energizing to rotate the pinion gear 35a for upward shift of the tray 2.

The pinion gear 35a is rotatably supported by the tray 2 in this configuration. The pinion gear 35a meshes with the rack gear 31 provided at the peripheral wall 11 of the holder body 1. The pinion gear 35a is rotated on the rack gear 31 to shift upward by energizing force of the energizing member 33. The tray 2 supporting the pinion gears 35a is also shifted upward.

When the tray 2 is pressed downward, each of the pinion gears 35a rotates on the rack gear 31 to shift downward along with the tray 2 against energizing force of the energizing member 33.

The energizing member 33 is provided at the tray 2 and does not couple the holder body 1 and the tray 2 to hang the tray 2. The energizing member 33 according to the above embodiment does not inhibit ascending of the tray 2. The tray 2 according to the above embodiment has higher flexibility in vertical positioning and higher flexibility in setting the uppermost position than the tray 2 of the cup holder 19 disclosed in Japanese Unexamined Patent Publication No. 2015-136976.

(2) In the configuration (1), preferably, the height adjuster 3 includes the transmitting shaft 34 provided below the lower surface of the tray 2 and extending in parallel with the lower surface, a pair of pinion gears 35a and 35a provided at the respective ends of the transmitting shaft 34, and a pair of rack gears 31 and 31 meshing with the pair of pinion gears 35a and 35a, the peripheral wall 11 has grooves 12 and 12a recessed radially outward, extending vertically, and provided with the rack gears 31, each of the grooves 12 and 12a has a pair of groove opposite surfaces 16a and 16a facing each other along the periphery of the accommodation space 10, the tray 2 is provided with a pair of guide protruded portions 22 and 22 vertically shiftably fitting to the grooves 12 and 12a, and each of the guide protruded portions 22 has a pair of tray opposite surfaces 22a and 22a facing the pair of groove opposite surfaces 16a and 16a and shaped to match the groove opposite surfaces 16a and 16a.

The rack gears 31 in this configuration are disposed in the grooves 12 and 12a, radially outside the accommodation space 10. The accommodation space 10 is thus not provided therein with obstacles such as the rack gears 31. The rack gears 31 are unlikely to be visually recognized to achieve excellent appearance of the accommodation space 10.

The pair of tray opposite surfaces 22a of each of the guide protruded portions 22 are in planar contact with the pair of groove opposite surfaces 16a and 16a in each of the grooves 12 and 12a. The guide protruded portions 22 are thus shiftable along the grooves 12 and 12a and are stably held to the groove opposite surfaces 16a and 16a without slanting from the grooves 12 and 12a. The tray 2 is thus smoothly vertically shiftable without slanting from the holder body 1.

(3) In the configuration (1) or (2), the height adjuster 3 preferably further includes a lock member 51 provided at the tray 2, the inhibitor 61 configured to be latched to the lock member 51 when the tray 2 is positioned at predetermined height in the accommodation space 10, a lock energizing member 56 provided between the lock member 51 and the tray 2 and energizing the lock member 51 to latch the lock member 51 to the inhibitor 61, and an operating part 6 configured to unlatch the inhibitor 61 from the lock member 51.

The tray 2 can be held at a predetermined position in the accommodation space 10 in this simple configuration.

(4) In any one of the configurations (1) to (3), preferably, the peripheral wall 11 has a groove 12 recessed radially outward, extending vertically, and provided with the rack gear 31, and the inhibitor 61 is provided at the groove 12.

In this configuration, the inhibitor 61 is disposed in the groove 12 provided radially outside the accommodation space 10. The accommodation space 10 is not provided with the inhibitor 61 as an obstacle to achieve excellent appearance. Furthermore, the rack gear 31 and the inhibitor 61 are provided at the identical groove 12. This configuration achieves a reduction in the number of the grooves 12 in comparison to the case where the rack gear 31 and the inhibitor 61 are provided at different grooves. This accordingly achieves excellent appearance of the accommodation space 10.

(5) In any one of the configurations (1) to (4), preferably, the holder body 1 has the upper wall 18 extending radially outward from the upper end of the peripheral wall 11, and the height adjuster 3 includes an upper engagement portion (an engagement hole 12h, the upper end of the groove 12) setting the uppermost position of the tray 2 to be as high as the upper wall 18.

(6) In any one of the configurations (1) to (5), preferably, the peripheral wall 11 has at least one groove 12 recessed radially outward, extending vertically, and provided with the rack gear, and a movable wall 71 openably covering the groove 12, and the movable wall 71 is energized to cover the groove 12 by a wall energizing member 75.

The movable wall 71 is energized to cover the groove 12 by the wall energizing member 75. The groove 12 is provided with the rack gear 31, and the pinion gear 35a provided at the tray 2 shifts on the rack gear 31. When the pinion gear 35a is positioned at a height provided with the movable wall 71, the movable wall 71 cannot close the groove 12 with the side surface of the movable wall 71 in contact with the pinion gear 35a. When the pinion gear 35a is positioned below the movable wall 71, the movable wall 71 is energized by the wall energizing member 75 and closes the groove 12 with no disturbance by the pinion gear 35a. The movable wall 71 closes the groove 12 to form a wall surface flush with a fixed wall 11a. This accordingly achieves excellent appearance of the accommodation space 10 without visual recognition of the groove 12.

The movable wall 71 is pressed to open the groove 12 in order to shift the tray 2 upward. The movable wall 71 then retreats from the groove 12 and the pinion gear 35a shifts upward on the rack gear 31 to shift the tray 2 upward.

(7) In the configuration (6), the tray 2 preferably includes a contact portion (an outer peripheral upper end 35p of the gear member 35) protruding toward the groove 12 and coming into contact with the lower end of the movable wall 71 when the tray 2 is located at the lowermost position.

The movable wall 71 is pressed to open the groove 12 in order to shift the tray 2 upward. The movable wall 71 then retreats from the groove 12 and the contact portion separates from the movable wall 71 to shift the tray 2 upward.

(8) In any one of the configurations (6) or (7), preferably, the peripheral wall 11 has a pair of grooves 12 provided at opposite portions with the accommodation space 10 interposed therebetween, the peripheral wall 11 is divided into two sections by the pair of grooves 12, a first one of the sections of the peripheral wall 11 configures the movable wall 71, and a second one of the sections of the peripheral wall 11 configures the fixed wall 11a.

The grooves 12 serve as boundaries between the movable wall 71 and the fixed wall 11a. The movable wall 71 and the fixed wall 11a are not distinguishable from each other and the boundaries between the movable wall 71 and the fixed wall 11a are hardly recognized when the accommodation space 10 is viewed. The peripheral wall appears to be configured by a single continuous wall in excellent appearance.

(9) The cup holder 19 according to a modification example of the present embodiment includes the holder body 1 having the peripheral wall 11 surrounding the accommodation space 10, the tray 2 provided in the accommodation space 10 and vertically shiftably supported by the peripheral wall 11, the height adjuster 3 configured to vertically shift the tray 2, the groove 12 provided at the peripheral wall 11 and at least partially accommodating the height adjuster 3, the movable wall 71 openably covering the groove 12, and the wall energizing member 75 energizing the movable wall 71 to cover the groove 12.

Examples of the height adjuster that can be accommodated in the groove include, in addition to the rack gear, a guide rail, and an inhibitor configured to latch the lock member to hold the tray at predetermined height. Examples of the height adjuster include, in addition to such a member that can be accommodated in the groove, the pinion gear according to the present embodiment rotatably supported by the lower surface of the tray, a spring to be provided between the tray and the bottom plate of the holder body, and a pantograph lifting device.

What is claimed is:

1. A cup holder comprising:
a holder body including a peripheral wall surrounding an accommodation space;
a tray provided in the accommodation space and vertically shiftably supported by the peripheral wall; and
a height adjuster configured to vertically shift the tray, wherein
the height adjuster includes:
at least one rack gear extending vertically on the peripheral wall;
at least one pinion gear rotatably supported by the tray and meshing with the rack gear;
a spring provided at the tray, wherein the spring provides energy to rotate the pinion gear for upward movement of the tray;
a transmitting shaft provided below a lower surface of the tray and extending in parallel with the lower surface;
a pair of pinion gears configured identically with the pinion gear and provided at respective ends of the transmitting shaft; and
a pair of rack gears configured identically with the rack gear and meshing with the pair of pinion gears,
the peripheral wall has grooves recessed radially outward, extending vertically, and provided with the rack gears,
each of the grooves has a pair of groove opposite surfaces facing each other along a periphery of the accommodation space,
the tray is provided with a pair of guide protruded portions vertically shiftably fitting to the grooves, and
each of the guide protruded portions has a pair of tray opposite surfaces facing the pair of groove opposite surfaces and shaped to match the groove opposite surfaces.

2. The cup holder according to claim 1, wherein
the holder body has an upper wall extending radially outward from an upper end of the peripheral wall, and
the height adjuster includes an upper engagement portion setting the uppermost position of the tray to be as high as the upper wall.

3. The cup holder according to claim 1, wherein
the peripheral wall has at least one groove recessed radially outward, extending vertically, and provided with the rack gear, and a movable wall openably covering the groove, and
the movable wall is energized to cover the groove by a wall spring.

4. The cup holder according to claim 3, wherein the tray includes a contact portion protruding toward the groove and coming into contact with a lower end of the movable wall when the tray is located at the lowermost position.

5. The cup holder according to claim 3, wherein
the groove is one of a pair of identically configured grooves, and the grooves are provided at opposite portions with the accommodation space interposed therebetween,
the peripheral wall is divided into two sections by the pair of grooves,
a first one of the sections of the peripheral wall configures the movable wall, and a second one of the sections of the peripheral wall configures a fixed wall.

6. A cup holder comprising:
a holder body including a peripheral wall surrounding an accommodation space;
a tray provided in the accommodation space and vertically shiftably supported by the peripheral wall; and a height adjuster configured to vertically shift the tray, wherein the height adjuster includes:
- at least one rack gear extending vertically on the peripheral wall;
- at least one pinion gear rotatably supported by the tray and meshing with the rack gear;
- a spring provided at the tray, wherein the spring provides energy to rotate the pinion gear for upward movement of the tray;
- a lock member provided at the tray;
- an inhibitor configured to be latched to the lock member when the tray is positioned at predetermined height in the accommodation space;
- a lock spring provided between the lock member and the tray, wherein the lock spring energizes the lock member to latch the lock member to the inhibitor; and
- an operating part configured to unlatch the lock member from the inhibitor.

7. The cup holder according to claim 6, wherein the peripheral wall has a groove recessed radially outward, extending vertically, and provided with the rack gear, and the inhibitor is provided at the groove.

* * * * *